(12) United States Patent
Yasaki et al.

(10) Patent No.: US 9,621,630 B2
(45) Date of Patent: Apr. 11, 2017

(54) DISTRIBUTION METHOD, DISTRIBUTION APPARATUS, AND TERMINAL APPARATUS

(71) Applicant: FUJITSU LIMITED, Kawasaki-shi, Kanagawa (JP)

(72) Inventors: Koichi Yasaki, Kawasaki (JP); Hidenobu Ito, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 126 days.

(21) Appl. No.: 14/611,860

(22) Filed: Feb. 2, 2015

(65) Prior Publication Data

US 2015/0244700 A1 Aug. 27, 2015

(30) Foreign Application Priority Data

Feb. 24, 2014 (JP) ................... 2014-033361

(51) Int. Cl.
| | | |
|---|---|---|
| H04L 9/00 | (2006.01) | |
| H04L 9/32 | (2006.01) | |
| H04L 29/08 | (2006.01) | |
| G06F 11/14 | (2006.01) | |
| G06F 21/44 | (2013.01) | |
| H04W 4/00 | (2009.01) | |
| H04W 12/10 | (2009.01) | |
| H04L 29/06 | (2006.01) | |

(52) U.S. Cl.
CPC .......... *H04L 67/06* (2013.01); *G06F 11/1402* (2013.01); *G06F 21/44* (2013.01); *H04L 67/02* (2013.01); *H04L 67/34* (2013.01); *H04W 4/001* (2013.01); *H04W 12/10* (2013.01); *H04L 63/123* (2013.01)

(58) Field of Classification Search
CPC ....... H04L 9/3281; H04L 63/08; H04L 67/02; H04L 67/34; G06F 21/10; G06F 21/12; G06F 21/64; G06F 21/565; G06F 21/44; G06F 11/1402; H04W 4/001; H04W 12/10
USPC .................. 713/176, 180, 187, 189; 726/26; 380/200–202; 705/51
See application file for complete search history.

(56) References Cited

U.S. PATENT DOCUMENTS

| | | | | |
|---|---|---|---|---|
| 7,506,338 | B2* | 3/2009 | Alpern ................. | G06F 9/44521 713/191 |
| 8,037,312 | B2* | 10/2011 | Takenaka ............ | G06F 21/6254 713/177 |
| 8,150,835 | B2* | 4/2012 | Boldyrev .......... | G06F 17/30427 707/693 |
| 8,464,249 | B1* | 6/2013 | Goldman ............ | H04L 63/0876 705/51 |
| 8,620,889 | B2* | 12/2013 | Sagar ..................... | G06F 17/30 707/705 |

(Continued)

FOREIGN PATENT DOCUMENTS

| | | |
|---|---|---|
| JP | 2001-223735 | 8/2001 |
| JP | 2007-503134 | 2/2007 |
| WO | 2005/017809 | 2/2005 |

*Primary Examiner* — Hosuk Song
(74) *Attorney, Agent, or Firm* — Fujitsu Patent Center

(57) ABSTRACT

A distribution method is disclosed. In a distribution method, a program to which a first signature is applied is divided. Control information including restore information pertinent to restoring the program and a second signature to secure divisional files of the program is attached to at least one of the divisional files. Each of the divisional files is sent via the Internet.

11 Claims, 18 Drawing Sheets

DISTRIBUTION SYSTEM 1000

(56) References Cited

U.S. PATENT DOCUMENTS

2006/0136728 A1 6/2006 Gentry et al.
2012/0246490 A1* 9/2012 Unagami ............... G06F 21/55
                                                    713/193

* cited by examiner

FIG.6

36 DIVISIONAL CONFIGURATION DB

| REQUEST No. | APPLICA-TION URL | APPLICATION CACHE STORAGE LOCATION | DIVISIONAL FILE STORAGE LOCATION | ENCRYPTED FILE STORAGE LOCATION | ENCRYPTION COMPLETION FLAG | ENCRYPTION KEY | DIVISION NUMBER | SIGNATURE CHECK KEY |
|---|---|---|---|---|---|---|---|---|
| 001 | http:// xxx/app1 | /tmp/xxx/ app1/original | /tmp/xxx/ app1/divide | /tmp/xxx/app1 /epkg/app1-1.epkg | True | /tmp/xxx/app1 /epkg/appkey | 3 | /tmp/xxx/app1 /original/signkey |
| 001 | http:// xxx/app1 | /tmp/xxx/ app1/original | /tmp/xxx/ app1/divide | /tmp/xxx/app1 /epkg/app1-2.epkg | False | /tmp/xxx/app1 /epkg/appkey | – | – |
| 001 | http:// xxx/app1 | /tmp/xxx/ app1/original | /tmp/xxx/ app1/divide | /tmp/xxx/app1 /epkg/app1-3.epkg | False | /tmp/xxx/app1 /epkg/appkey | – | – |
| 002 | http:// xxx/app2 | /tmp/xxx/ app2/original | /tmp/xxx/ app2/divide | /tmp/xxx/app2 /epkg | True | /tmp/xxx/app2 /epkg/appkey | 1 | /tmp/xxx/app2 /original/signkey |
| ... | ... | ... | ... | ... | ... | ... | ... | ... |

FIG.11

| URL | FILE NAME | DIVISION NUMBER | EXECUTABLE STATE | DL COMPLETION FLAG |
|---|---|---|---|---|
| http://xxx/app1 | app1-1.zip | 3 | EXECUTABLE | COMPLETED |
| http://xxx/app1 | app1-2.zip | – | NON-EXECUTABLE | COMPLETED |
| http://xxx/app1 | app1-3.zip | – | NON-EXECUTABLE | NOT COMPLETED |
| http://xxx/app2 | app2.zip | 1 | NON-EXECUTABLE | NOT COMPLETED |
| ... | ... | ... | ... | ... |

58 ASSEMBLE DB

DISTRIBUTION METHOD, DISTRIBUTION APPARATUS, AND TERMINAL APPARATUS

CROSS-REFERENCE TO RELATED APPLICATIONS

This application is based upon and claims the benefit of priority of the prior Japanese Priority Application No. 2014-033361 filed on Feb. 24, 2014, the entire contents of which are hereby incorporated by reference.

FIELD

The embodiment discussed herein is related to a technology for dividing and distributing a program.

BACKGROUND

Conventionally, in a case of conducting data transmission, when a data size is a large amount, depending on a data transmission condition such as a traffic state of a network, data transmission abilities of a sender and a receiver, and the like, data are divided and transmitted. In order to assure each set of divided data, the sender applies a digital signature for each set of divided data, and the receiver verifies each set of the divided data. Another technology proposes that a source or intermediary (or both) can remove certain portions of the data stream without inhibiting the ability of the ultimate receiver to verify the authenticity and integrity of the data received.

PATENT DOCUMENTS

Japanese Laid-open Patent Publication No. 2001-223735
Japanese Laid-open Patent Publication No. 2007-503134

SUMMARY

According to one aspect of the embodiment, there is provided a distribution method performed in a computer, the distribution method including: dividing a program to which a first signature is applied; attaching control information including restore information pertinent to restoring the program and a second signature to secure divisional files of the program, to at least one of the divisional files; and sending each of the divisional files via an Internet.

According to other aspects of the embodiment, there are provided a distribution apparatus, a distribution system, a distribution program, and a non-transitory computer-readable recording medium.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 6 is a diagram illustrating a data configuration example of a divisional configuration DB;
FIG. 11 is a diagram illustrating a data configuration example of an assemble DB.

DESCRIPTION OF EMBODIMENTS

In the following, embodiments of the present invention will be described with reference to the accompanying drawings.

Recently, such as a desk top, a lap top, a palm top, and the like, various types of personal computers (PCs) have been widely used. Applications (capable of operating on multiple platforms), which do not depend on a platform such as an Operating System (OS) and the like for various types of the PCs, have been developed. Hence, even if various multiple PCs are used, a user uses the same application without concern for differences among various multiple platforms.

HyperText Markup Language 5 (HTML5) is mainly used by developing the application which operates on the multiple platforms. "Packaged web apps" are a specification in order to activate the application developed by HTML5 in an off-line state. In practice, Cascading Style Sheets (CSS) and Javascript (registered trademark) are used as external style sheets in addition to the HTML5.

In applications operating on a browser, the "packaged web apps" are regarded as applications which reside in a client terminal and operate in the off-line state at the client terminal after being provided from a server. Hereinafter, the "packaged web apps" are simply called applications.

In general, when an application is downloaded to the client terminal, files for an operation are packaged into one file, and a digital signature for an interpolation detection is applied.

On the other hand, the HTML5 is a language developed to be instantly activated on the browser when the HTML5 is provided from a server apparatus to the client terminal. The user using the application developed by the HTML5 also expects that the application is instantly activated on the browser.

However, in a case in which a file size of the application being packaged is greater, in distribution of sets of the divided data, a receiver takes time to assemble the sets of divided data and to check the digital signature. It may be difficult to execute the application at a moment the user desires to browse.

Accordingly, the embodiment provides a technology for instantly activating the application even if the application is distributed by the sets of the divided data.

Figure 1:
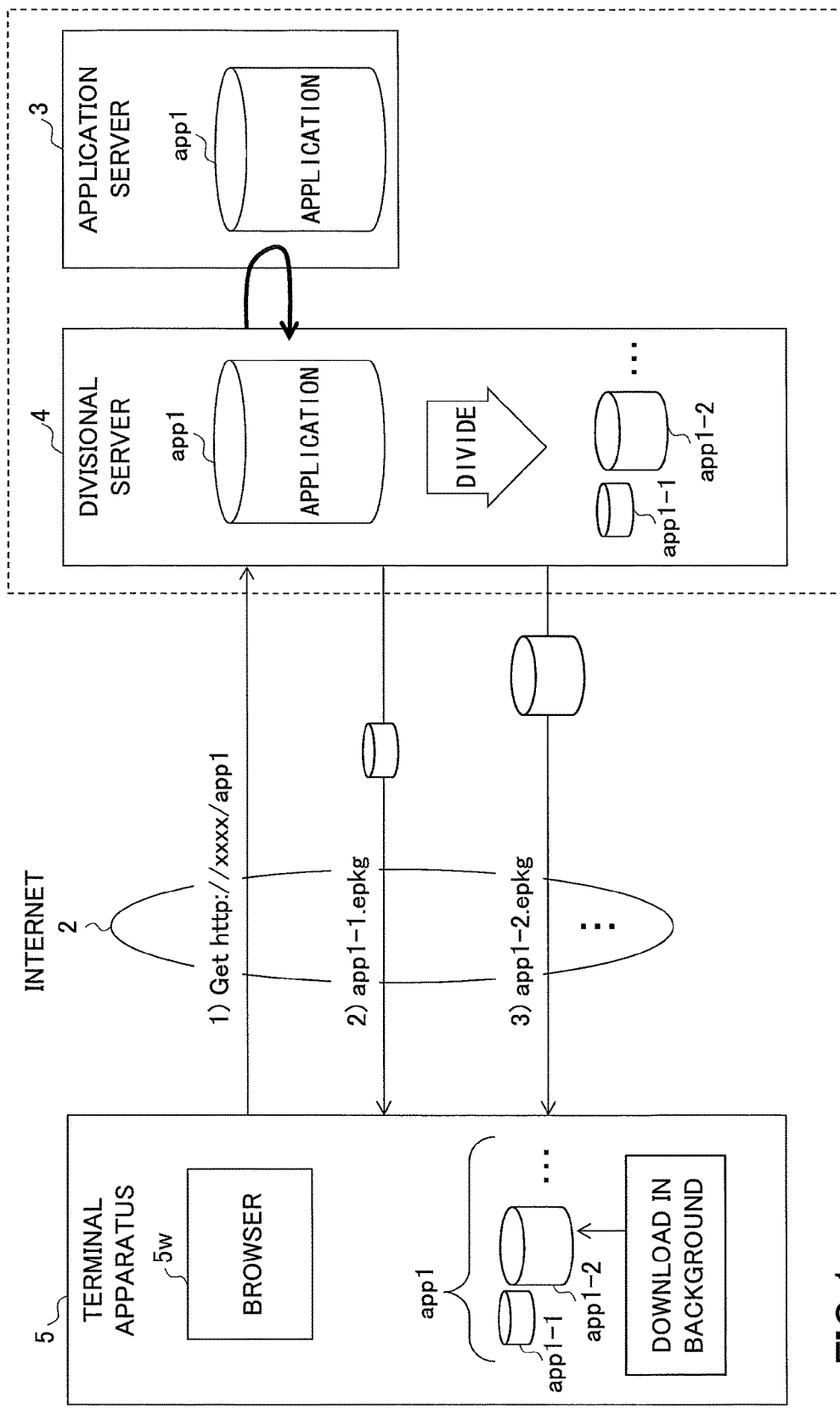
FIG. 1 is a diagram illustrating a configuration example of a distribution system.

FIG. 1 is a diagram illustrating a configuration example of a distribution system. In FIG. 1, the distribution system 1000 includes an application server 3, a divisional server 4, and a terminal apparatus 5. The terminal apparatus 5 connects to the divisional server 4 via an Internet 2. Also, the application server 3 and the divisional server 4 are also capable of connecting to the Internet 2 or the like by communications. Processes conducted by the application server 3 and processes conducted by the divisional server 4 may be conducted by one server.

The application server 3 includes an application app1 which is capable of activating in the off-line state and is packaged. That is, the application server 3 is a server which applies a digital signature (hereinafter, simply called "signature") to the application app1 by using a first key so as to provide application app1 outside. Since the application server 3 attaches the signature to the application app1, the application app1 is secured.

The divisional server 4 divides the application app1 of the application server 3 into divisional packages app1-1 and app1-2, applies the signature to the divisional packages app1-1 and app1-2, and encrypts each of the divisional packages app1-1 and app1-2 by using a second key. After that, the divisional server 4 securely transmits the divisional packages app1-1 and app1-2 outside. Each of the divisional packages app1-1 and app1-2 are secured by the divisional server 4. The signature conducted by divisional server 4 is called "divisional signature".

The terminal apparatus 5 is a mobile communication device which includes a browser 5w and is used by a user.

In the distribution system 1000, when a download request (Get http://xxxx/app1) of the application app1, which is desired by the user, is made from the browser 5w of the terminal apparatus 5 via the Internet 2, the divisional server 4 transmits the divisional applications app1-1 and app1-2 which are acquired from the application server 3 and in which the application app1 is divided, respectively, via the Internet 2. The divisional packages app1-1 is transmitted in a form of app1-1.epkg, and the divisional package app1-2 is transmitted in a form of app1-2.epkg.

The terminal apparatus 5 executes the divisional package ap1-1 received from the divisional server 4 on the browser 5w while downloading the divisional package app1-2 in the background. In response to a download completion of the divisional package app1-2, the terminal apparatus 5 executes the divisional package app1-2 on the browser 5w.

In the distribution system 1000, the terminal apparatus 5 receives and executes in parallel the divisional packages app1-1 and app1-2. Thus, it is possible to promptly execute the application app1. Moreover, it is possible to receive the divisional packages app1-1 and app1-2 which are secured by the divisional server 4.

Figure 2:
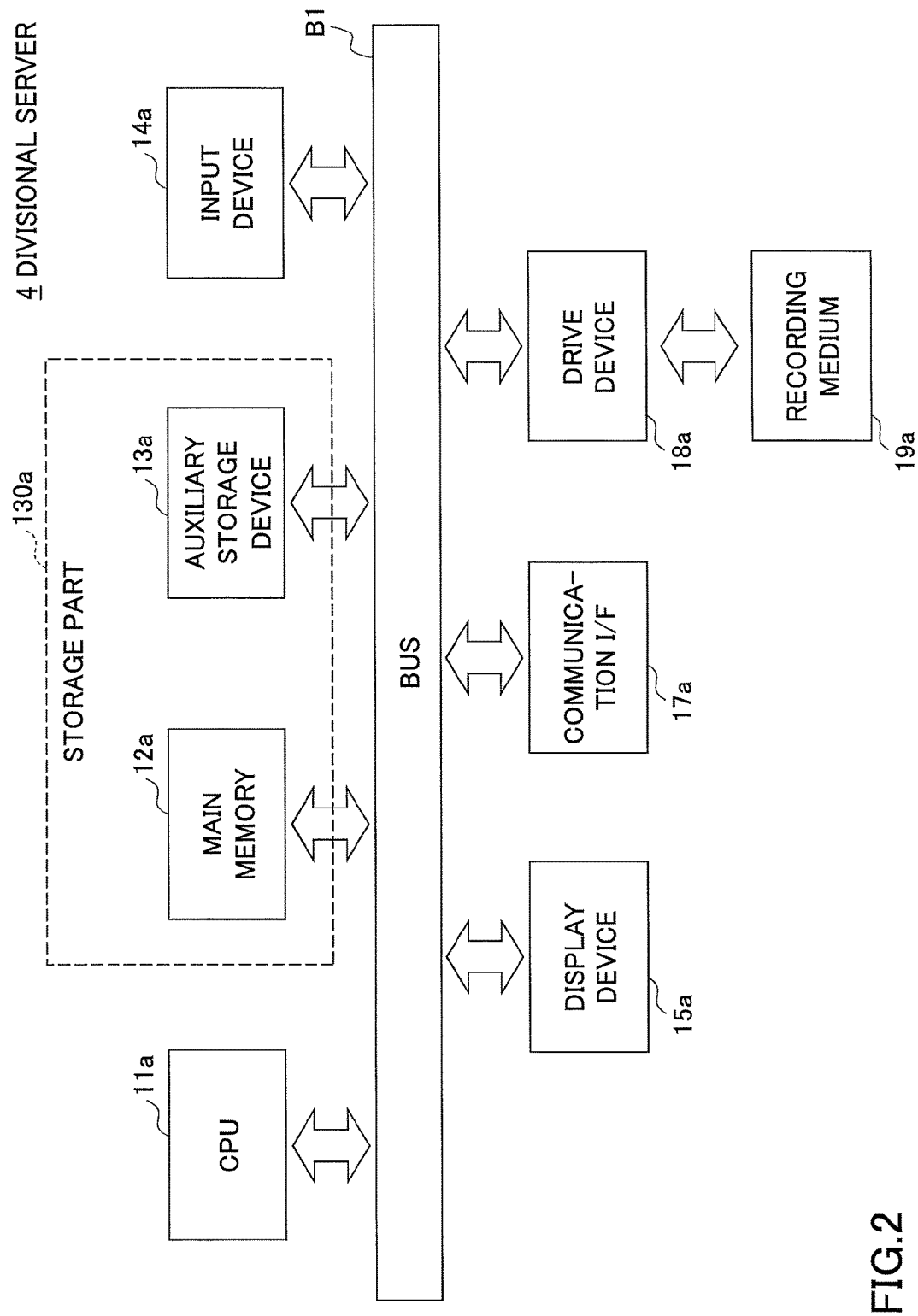
FIG. 2 is a diagram illustrating a hardware configuration of a divisional server.

FIG. 2 is a diagram illustrating a hardware configuration of the divisional server. In FIG. 2, the divisional server 4 is an apparatus controlled by a computer, and includes a CPU (Central Processing Unit) 11a, a main memory 12a, an auxiliary storage device 13a, an input device 14a, a display device 15a, a communication InterFace (I/F) 17a, and a drive device 18a, which are connected to a bus B1.

The CPU 11a is regarded as a processor which controls the divisional server 4 in accordance with a program stored in the main memory 12a. A Random Access Memory (RAM), a Read Only Memory (ROM), and/or the like may be used as the main memory 12a. The main memory 12a stores or temporarily retains the program to be executed by the CPU 11a, data for a process conducted by the CPU 11a, data acquired in the process conducted by the CPU 11a, and the like.

A Hard Disk Drive (HDD) or the like may be used as the auxiliary storage device 13a to store programs, data, and the like to perform various processes. A part of the program being stored in the auxiliary storage device 13a is loaded into the main memory 12a. The process is conducted by the CPU 11a executing the part of the program. A storage part 130a includes at least one of the main memory 12a and the auxiliary storage device 13a.

The input device 14a may include a mouse, a keyboard, and the like, and is used for a user of the divisional server 4 to input various information items used in the process conducted by the divisional server 4. The display device 15a displays various information items concerning the process under control of the CPU 11a. The communication I/F 17a is an interface for communicating with the terminal apparatus 5 and the application server 3. Communications by the communication I/F 17a are not limited to wireless communication or wired communication.

The program realizing the process conducted by the divisional server 4 may be provided to the divisional server 4 with a recording medium 19a such as a Compact Disc Read-Only Memory (CD-ROM) or the like.

The drive device 18a interfaces between the recording medium 19a (which may be the CD-ROM or the like) set in the drive device 18a and the divisional server 4.

The recording medium 19a stores a program which realizes various processes according to the embodiment which will be described below. The program stored in the recording medium 19a is installed into the divisional server 4 via the drive device 18a. The installed program becomes available to be executed in the divisional server 4.

A medium for storing the program may be formed by a non-transitory (or tangible) computer-readable recording medium, and is not limited to the CD-ROM. As the computer-readable recording medium, in addition to the CD-ROM, a portable recording medium such as a Digital Versatile Disk (DVD), a Universal Serial Bus (USB) memory, a semiconductor memory such as a flash memory, or the like may be used as the computer-readable recording medium 19.

Figure 3:
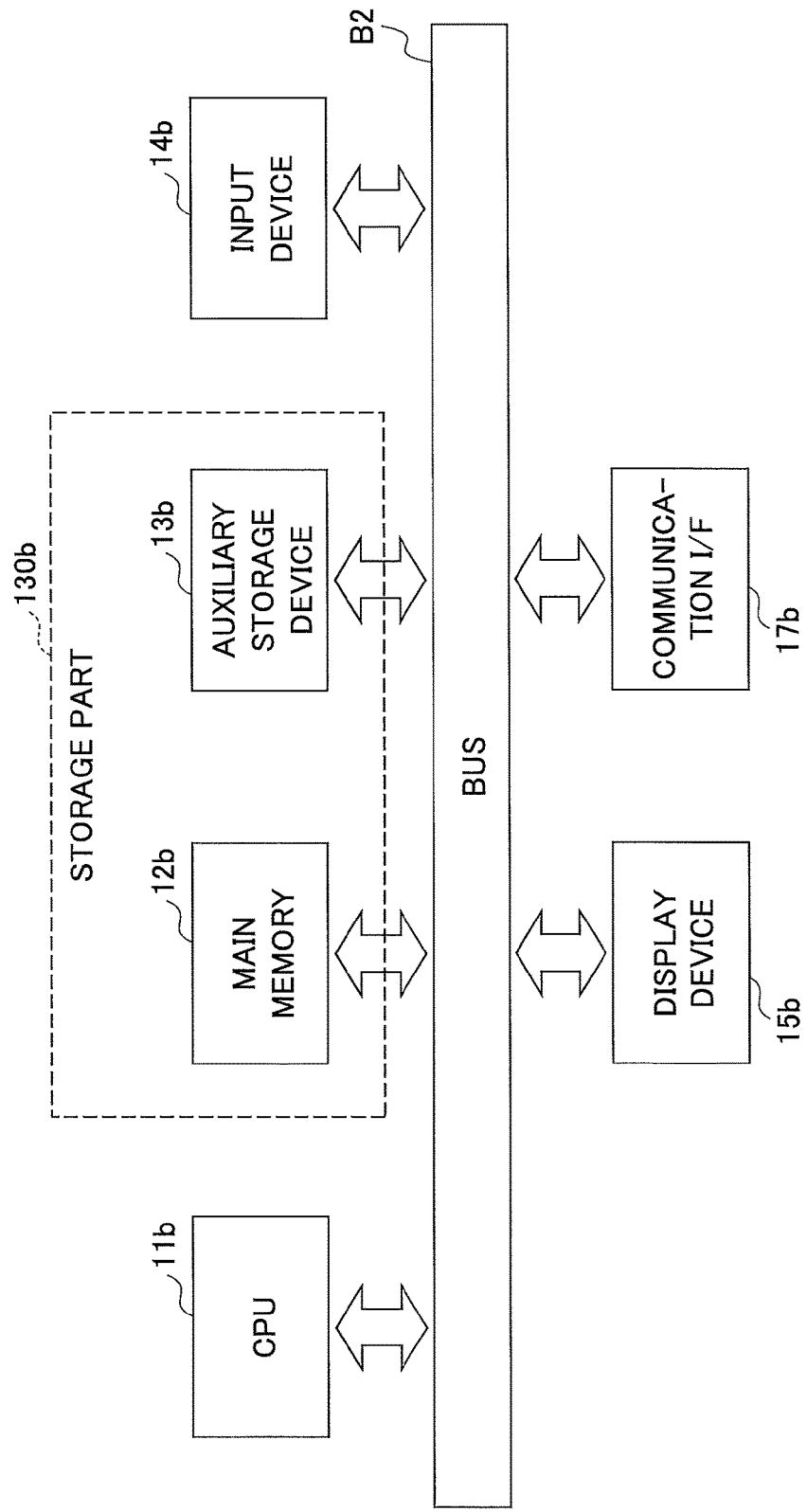
FIG. 3 is a diagram illustrating a hardware configuration of a terminal apparatus.

FIG. 3 is a diagram illustrating a hardware configuration of the terminal apparatus 5. In FIG. 3, the terminal apparatus 5 is a terminal controlled by a computer, and includes a Central Processing Unit (CPU) 11b, a main memory 12b, an auxiliary storage device 13b, an input device 14b, an display device 15b, and an communication I/F 17b, which are connected to a bus B2.

The CPU 11b controls the terminal apparatus 5 in accordance with the program stored in the main memory 12b. A Random Access Memory (RAM), a Read Only Memory (ROM), and/or the like may be used as the main memory 12b. The main memory 12b stores or temporarily retains the program to be executed by the CPU 11b, data for a process conducted by the CPU 11b, data acquired in the process conducted by the CPU 11b, and the like.

A Hard Disk Drive (HDD) or the like may be used as the auxiliary storage device 13b to store programs, data, and the like to perform various processes. A part of the program being stored in the auxiliary storage device 13b is loaded into the main memory 12b. The process is conducted by the CPU 11a executing the part of the program. A storage part 130b includes at least one of the main memory 12b and the auxiliary storage device 13b.

The input device 14b may include an operation part arranging keys, and is used for a user of the terminal apparatus 5 to input various information items used in the process conducted by the terminal apparatus 5. The display device 15b displays various information items concerning the process under control of the CPU 11b. If the input device 14b is realized by software keys, the input device 14b and the display device 15b may be integrated as a touch panel. The communication I/F 17b may conduct wireless communications through the network.

A program of the above-described application app1, which realizes a process in the terminal apparatus 5, may be provided from the divisional server 4 via the communication I/F 17b.

Figure 4:
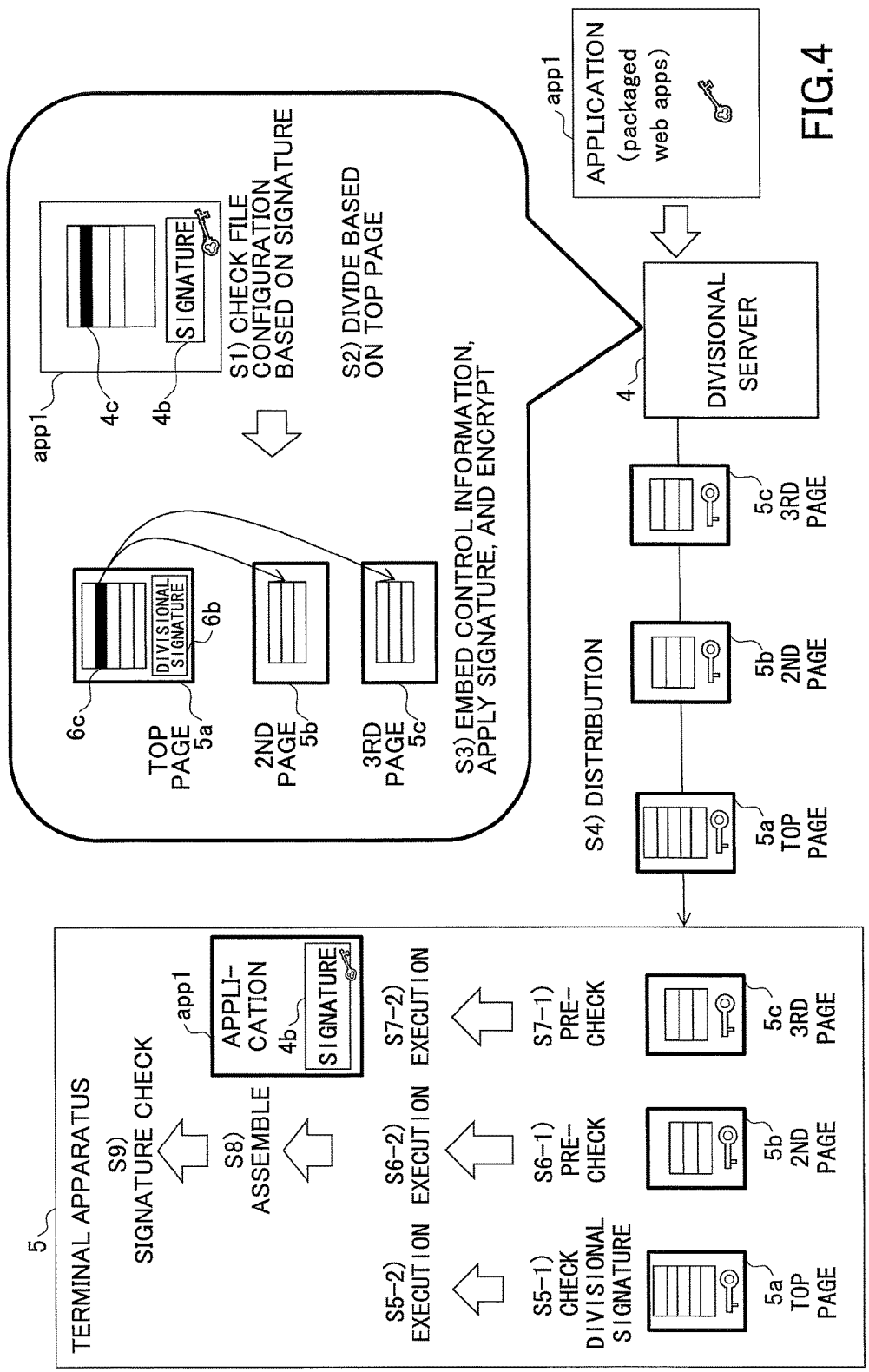
FIG. 4 is a diagram for explaining a distribution process according to the embodiment.

FIG. 4 is a diagram for explaining a distribution process according to the embodiment. In FIG. 4, the divisional server 4 decrypts the application app1 being packaged, and checks a file configuration based on a signature 4b of the application server 3 which is applied to the application app1 (step S1). The file configuration is acquired by analyzing control information 4c.

The divisional server 4 analyzes a page configuration from contents of a top page, and divides the application appp1 by a file unit (step S2). In general, one page is formed into one file. In FIG. 3, the application app1 is divided into three corresponding to a top page 5a, a second page 5b, and a third page 5c. One divisional portion may be one file (that is, one page). Alternatively, one divisional portion may include more than one file.

The divisional server 4 determines a dividing method based on the file configuration. After that, the divisional server 4 creates control information 6c by adding information indicating a divisional package including a page for each page to the control information 4c, and attaches the control information 6c to the top page 5a.

Next, the divisional server 4 applies a divisional signature 6b to the top page 5a, and encrypts the top page 5a, the second page 5b, and the third page 5c by using a second key of the divisional server 4 (step S3).

The divisional server 4 distributes the top page 5a, the second page 5b, and the third page 5c to the terminal apparatus 5 (step S4).

When receiving the top page 5a, the terminal apparatus 5 checks, by using the divisional signature 6b, the top page 5a, and acquires control information 6c (step S5-1). After decrypting the top page 5a, the terminal apparatus 5 executes the top page 5a on the browser 5w (step S5-2). On the other hand, the terminal apparatus 5 receives the second page 5b and the third page 5c in the background.

The control information 6c is additionally provided to the top page 5a, and tokens are included as pointers to the second page and the third page, which are divided from the application app1, in the control information 6c. A pre-check is performed as a process for confirming whether the tokens included in the control information 6c correspond to respective tokens indicated in the second page 5b and the third page 5c.

When receiving the second page 5b in the background, the terminal apparatus 5 pre-checks the second page 5b (step S6-1), encrypts the second page 5b, and activates the second page 5b on the browser 5w (step S6-2). In the same manner, when receiving the third page 5c in the background, the terminal apparatus 5 pre-checks the third page 5c (step S7-1), encrypts the third page 5c, and activates the third page 5c on the browser 5w (step S7-2).

When all pages 5a, 5b, and 5c are decrypted, the terminal apparatus 5 assembles the pages 5a, 5b, and 5c in accordance with the control information 6c, and restores the application app1 (step S8). After that, the terminal apparatus 5 checks the signature of the application server 3 (step S9).

Figure 5:
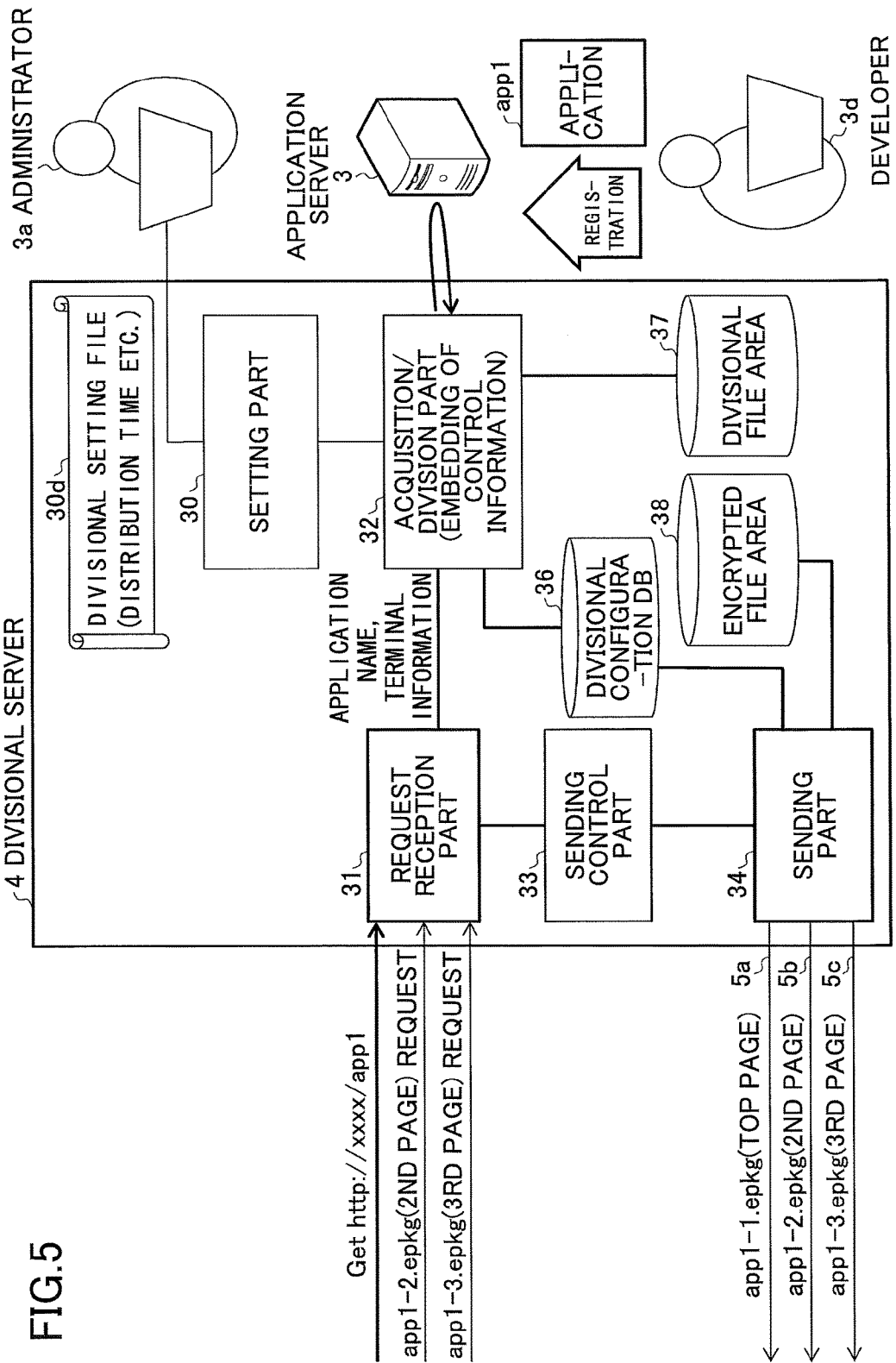
FIG. 5 is a diagram illustrating a functional configuration example of a divisional server.

In the following, the divisional server 4 will be described. FIG. 5 is a diagram illustrating a functional configuration example of the divisional server 4. In FIG. 5, the divisional server 4 includes a setting part 30, a request reception part 31, an acquisition/division part 32, a sending control part 33, and a sending part 34, which may be realized by the CPU 11a executing corresponding programs. The storage part 130a includes a divisional configuration DB 36, a divisional file area 37, an encrypted file area 38, and the like.

The application app1 is developed by a developer 3d and is provided to the terminal apparatus 5. The application app1 becomes available to be provided to the terminal apparatus 5 by being registered to the application server 3.

The setting part 30 displays a screen for setting items pertinent to dividing of the application app1 at the display device 15a, and stores a divisional setting file 30d, which an administrator 3a inputs, in the storage part 130a. The divisional setting file 30d includes information of minimum time for distribution, and the like.

When receiving an acquisition request of an application (which may indicate Get http://xxxx/app1) from the terminal apparatus 5, the request reception part 31 acquires an application name and terminal information from the acquisition request and reports to the acquisition/division part 32 and the sending control part 33.

Also, when receiving a request of divisional files (such as app1-2.epkg, app1-3.epkg, and the like) from the terminal apparatus 5 after the acquisition request of the application (Get http://xxxx/app1), the request reception part 31 reports this acquisition request to the sending control part 33.

The acquisition/division part 32 acquires the application (for example, app1) from the application server 3 in response to the report of the acquisition request from the request reception part 31, and divides the application based on a page configuration. The top page 5a, the second page 5b, and the third page 5c, which are acquired by dividing the application, are stored as a divisional file in the divisional file area 37 of the storage part 130a.

Also, the acquisition/division part 32 embeds the control information 6c into the top page 5a, and encrypts the top page 5a, the second page 5b, and the third page 5c. The top page 5a, the second page 5b, and the third page 5c, which are encrypted, are stored in the encrypted file area 38.

The sending control part 33 makes a schedule to send the application by a division unit in response to the report of the acquisition request from the request reception part 31.

The sending part 34 sends the top page 5a, the second page 5b, and the third page 5c (for example, app1-1.epkg, app1-2.epkg, and app1-3.epkg) in the encrypted file area 38 to the terminal apparatus 5 in accordance with the schedule made by the sending control part 33.

The divisional configuration DB 36 includes a data configuration as depicted in FIG. 6. FIG. 6 is a diagram illustrating a data configuration example of the divisional configuration DB. In FIG. 6, the divisional configuration DB 36 includes items of "REQUEST NO.", "APPLICATION URL", "APPLICATION CACHE STORAGE LOCATION", "DIVISIONAL FILE STORAGE LOCATION", "ENCRYPTED FILE STORAGE LOCATION", "ENCRYPTION COMPLETION FLAG", "ENCRYPTION KEY", "DIVISION NUMBER", "SIGNATURE CHECK KEY", and the like.

The "REQUEST NO." indicates a number applied to identify the acquisition request of the application from the terminal apparatus 5. The "APPLICATION URL" indicates a Uniform Resource Locator (URL) of the application which is indicated by the acquisition request. The "APPLICATION CACHE STORAGE LOCATION" indicates a storage location of an original application. The "DIVISIONAL FILE STORAGE LOCATION" indicates the storage location of the divisional file which is created by dividing the application.

The "ENCRYPTED FILE STORAGE LOCATION" indicates the storage location of the divisional file after the encryption. The "ENCRYPTION COMPLETION FLAG" indicates "TRUE" when the encryption is completed, and indicates "FALSE" when the encryption has not been completed. The "ENCRYPTION KEY" indicates a second key used by the divisional server 4 to encrypt the divisional file.

The "DIVISION NUMBER" indicates a number of divisions of the application indicated by the acquisition request. The "SIGNATURE CHECK KEY" is used by the divisional server 4 to apply the divisional signature to the divisional file including the top page 5a.

The divisional configuration DB 36 depicted in FIG. 6 may indicate that the application app1 indicated by "http://xxx/app1" recorded in the "APPLICATION URL" is stored in "/tmp/xxx/app1/original" recorded in the "APPLICATION CACHE STORAGE LOCATION".

The "DIVISIONAL FILE STORAGE LOCATION" may indicate that each of the divisional files acquired by dividing the application app1 is stored at "/tmp/xxx/app1/divide".

By encrypting and packaging the divisional files, the divisional packages app1-1, app1-2, and app1-3 are generated. The "ENCRYPTED FILE STORAGE LOCATION" indicates that the divisional packages app1-1, app1-2, and app1-3 are stored at "/tmp/xxx/app1/epkg/app1-1.epkg", "/tmp/xxx/app1/epkg/app1-2.epkg", and "/tmp/xxx/app1/epkg/app1-3.epkg".

The "DIVISION NUMBER" indicates that an original application app1 is divided into three. The "SIGNATURE CHECK KEY" may indicate "/tmp/xxx/app1/original/signkey" to obtain a key in order to create the divisional signature.

Figure 7:
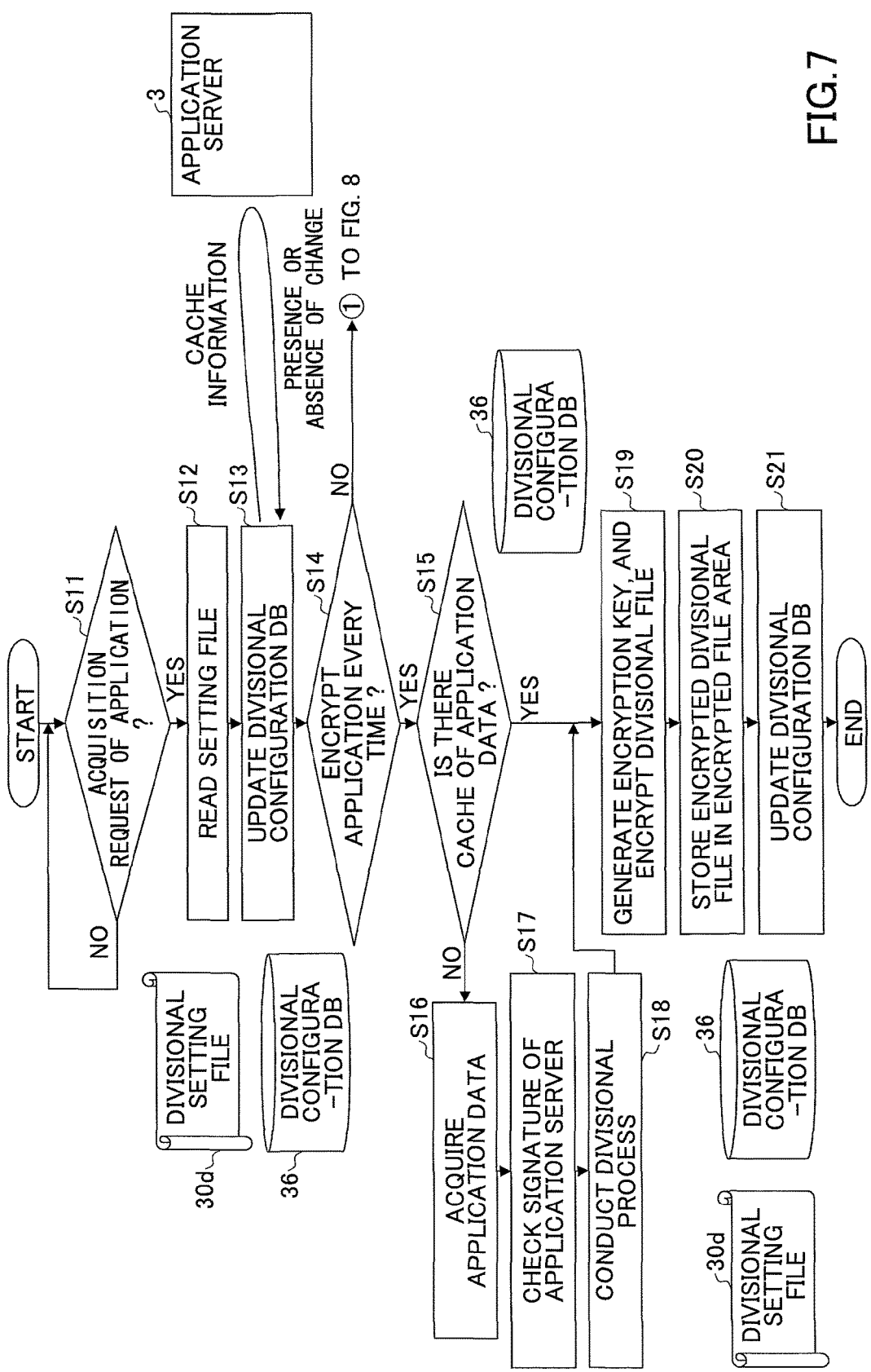
FIG. 7 is a flowchart for explaining an acquisition/division process conducted at the divisional server.
Figure 8:
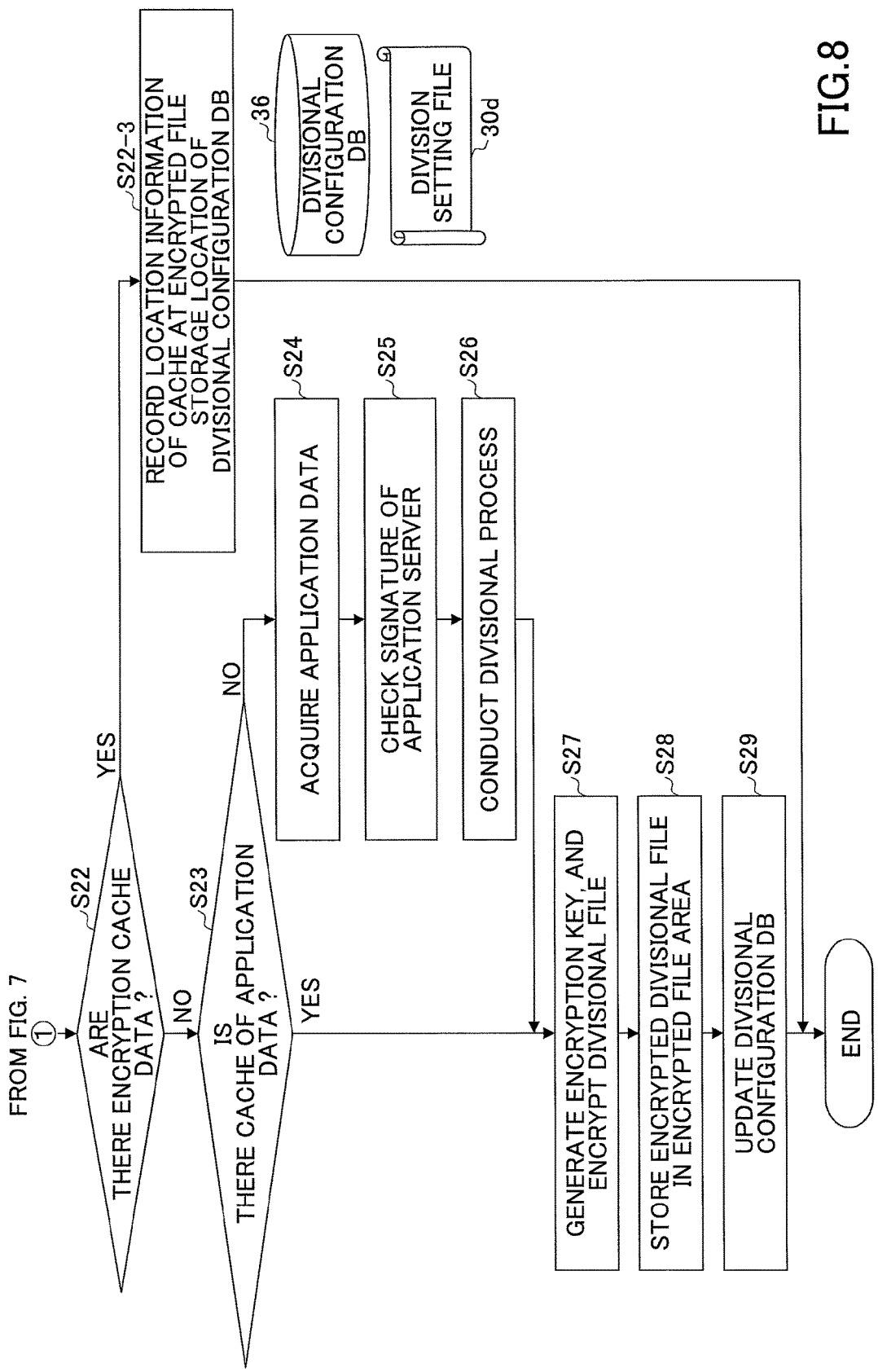
FIG. 8 is a flowchart for explaining the acquisition/division process conducted at the divisional server.

An acquisition/division process conducted by the acquisition/division part 32 will be described. FIG. 7 and FIG. 8 are flowcharts for explaining the acquisition/division process conducted at the divisional server 4. In the divisional server 4, the acquisition/division part 32 may be realized by the CPU 11a executing a corresponding program.

In FIG. 7, the acquisition/division part 32 determines whether the report received from the request reception part 31 indicates the acquisition request of the application (step S11). When the report does not indicate the acquisition request of the application (NO in step S11), the acquisition/division part 32 repeats step S11 at predetermined intervals.

On the other hand, when the report indicates the acquisition request of the application (YES in step S11), the acquisition/division part 32 reads the divisional setting file 30d stored in the storage part 130a (step S12). Also, the acquisition/division part 32 updates the divisional configuration DB 36 based on a presence or absence of a change of the application which is information acquired from the application server 3 (step S13).

That is, the acquisition/division part 32 may send cache information retained in the divisional server 4 to the application server 3, and may acquire the information indicating the presence or absence of the change of the application from the application server 3. When a changed application exists, the acquisition/division part 32 may delete the application which has been changed, from a cache area, and may also delete a value of the "APPLICATION CACHE STORAGE LOCATION" for the application in the divisional configuration DB 36.

The acquisition/division part 32 refers to the divisional setting file 30d, and confirms whether the application indicated by the acquisition request is encrypted each time (step S14). When the application is not encrypted each time (NO in step S14), the acquisition/division part 32 advances to step S22 (FIG. 8).

When the application is encrypted each time (YES in step S14), the acquisition/division part 32 determines whether there is a cache of application data (step S15). That is, the acquisition/division part 32 may search for the "APPLICATION URL" indicating the application being requested from the divisional configuration DB 36, and may confirm whether a value exists in the "APPLICATION CACHE STORAGE LOCATION" corresponding to a value of the "APPLICATION URL". When the value exists in the "APPLICATION CACHE STORAGE LOCATION" (YES in step S15), the acquisition/division part 32 advances to step S19.

When the value does not exist in the "APPLICATION CACHE STORAGE LOCATION" (NO in step S15), the acquisition/division part 32 acquires the application which the terminal apparatus 5 requests, from the application server 3 (step S16). The application acquired from the application server 3 may be cached into the storage part 130a. A storage location of the application may be stored in the "APPLICATION CACHE STORAGE LOCATION" in the configuration DB 36.

After that, the acquisition/division part 32 checks the signature of the application server 3 (step S17), and conducts a divisional process (step S18). The divisional files acquired by dividing the application are stored in the divisional file area 37.

The acquisition/division part 32 may store the storage location in the divisional file area 37 to the "DIVISIONAL FILE STORAGE LOCATION" of the divisional configuration DB 36 for each of the divisional files. Moreover, the acquisition/division part 32 may store a value of the "DIVISION NUMBER" with respect to one of the divisional files in the divisional configuration DB 36. The value of the "DIVISION NUMBER" may be stored by corresponding to the divisional file of the top page 5a. The acquisition/division part 32 advances to step S19.

When there is the cache of the application data (YES in step S15), or when the divisional process in step S18 is completed in step S18, the acquisition/division part 32 generates an encryption key of the divisional server 4 and encrypts each of the divisional files (step S19), and stores the encrypted divisional files in the encrypted file area (step S20).

After that, the acquisition/division part 32 records a storage destination of each of the encrypted divisional files to the "ENCRYPTED FILE STORAGE LOCATION" of the divisional configuration DB 36, sets "TRUE" to the "ENCRYPTION COMPLETION FLAG" thereof, and records the encryption key, so as to update the divisional configuration DB 36 (step S21).

In FIG. 8, when it is determined in step S14 in FIG. 7 that the application is not encrypted each time, the acquisition/division part 32 determines whether there are encryption cache data of the application being requested in the storage part 130*a* (step S22). When there are the encryption cache data (YES in step S22), the acquisition/division part 32 records location information of the encryption cache data to the "ENCRYPTED FILE STORAGE LOCATION" of the divisional configuration DB 36 (step S22-3). After that, the acquisition/divisional process is terminated.

When there is no encryption cache data (NO in step S22), the acquisition/division part 32 further determines whether there is a cache of the application data (step S23). When there is no cache of the application data (NO in step S23), the acquisition/division part 32 acquires the application data (step S24).

After that, the acquisition/division part 32 checks the signature of the application server 3 (step S25), and conducts the divisional process (step S26). The acquisition/division part 32 may store the storage location to the "DIVISIONAL FILE STORAGE LOCATION" of the divisional configuration DB 36 for each of the divisional files. Moreover, the acquisition/division part 32 may store a value of the "DIVISION NUMBER" with respect to one of the divisional files in the divisional configuration DB 36. The value of the "DIVISION NUMBER" may be stored by corresponding to the divisional file of the top page 5*a*. The acquisition/division part 32 advances to step S27.

When it is determined in step S15 that there is the cache of the application data, or when the divisional process in step S18 is terminated, the acquisition/division part 32 generates the encryption key of the divisional server 4, and encrypts the divisional files (step S27). The acquisition/division part 32 stores the encrypted divisional files in the encrypted file area 38 (step S28).

After that, the acquisition/division part 32 records a storage destination of each of the encrypted divisional files to the "ENCRYPTED FILE STORAGE LOCATION" of the divisional configuration DB 36, sets "TRUE" to the "ENCRYPTION COMPLETION FLAG" thereof, and records the encryption key, so as to update the divisional configuration DB 36 (step S29).

Figure 9:
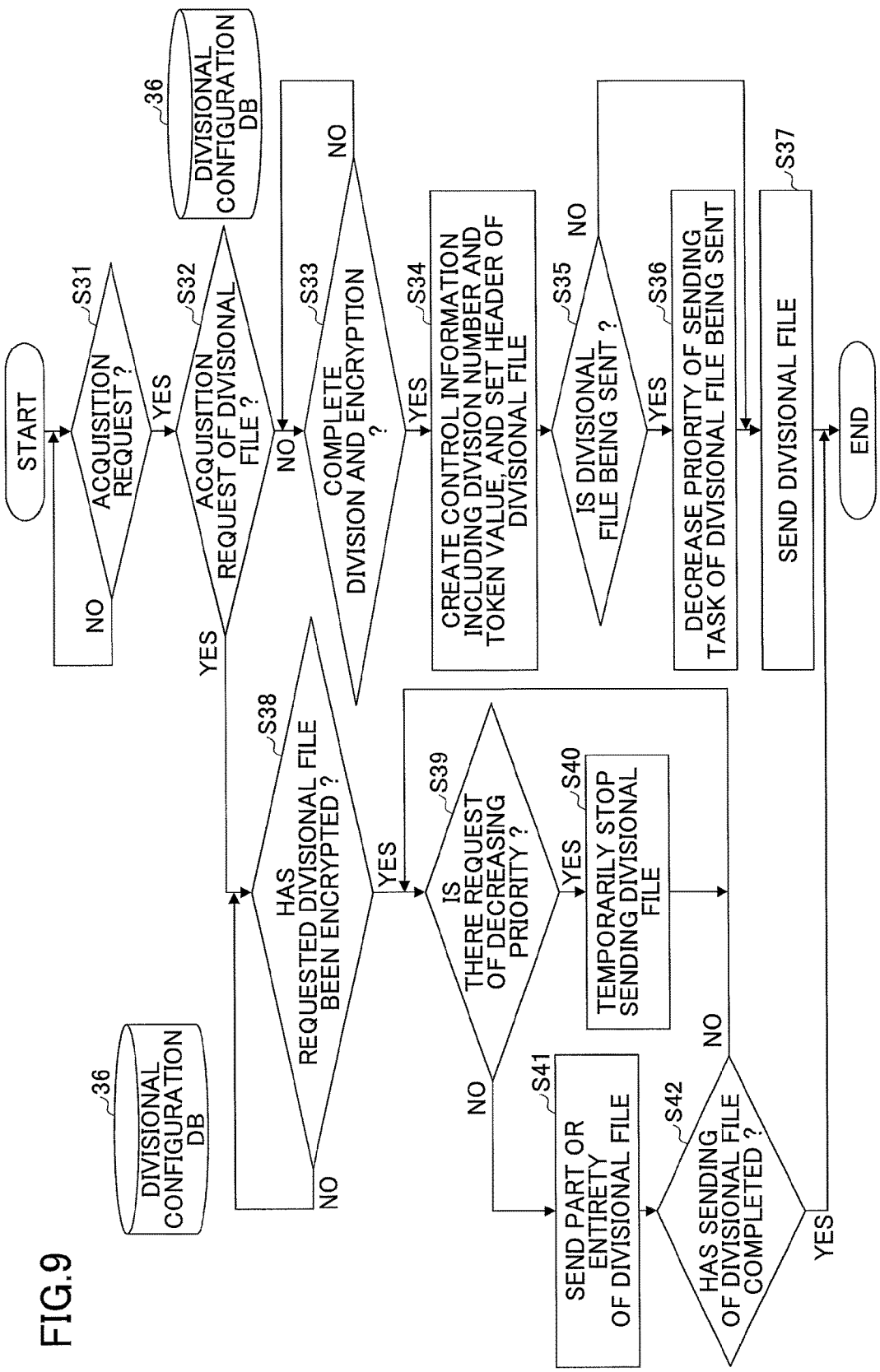
FIG. 9 is a flowchart for explaining a transmission control process.

A transmission control process conducted by the sending control part 33 will be described. FIG. 9 is a flowchart for explaining the transmission control process. In the divisional server 4, the sending control part 33 may be realized by the CPU 11*a* executing a corresponding program.

In FIG. 9, the sending control part 33 determines whether the report received from the request reception part 31 indicates the acquisition request of the application (step S31). When the report does not indicate the acquisition request of the application (NO in step S31), the sending control part 33 repeats step S31 at predetermined intervals.

When the report indicates the acquisition request of the application (YES in step S31), the sending control part 33 further determines whether the report indicates the acquisition request of the divisional files (step S32). When the report indicates the acquisition request of the divisional files (YES in step S32), the sending control part 33 advances to step S38.

When the report does not indicate the acquisition request of the divisional files (NO in step S32), the sending control part 33 determines whether the division and encryption of the application are completed (step S33). The sending control part 33 may determine by referring to the "ENCRYPTION COMPLETION FLAG" and the "DIVISION NUMBER" corresponding to the "APPLICATION URL" indicated by the acquisition request. When the sending control part 33 determines that the division and encryption of the application have not been completed (NO in step S33), the sending control part 33 repeats step S33 at predetermined intervals.

When the division and encryption of the application have been completed (YES in step S33), the sending control part 33 creates the control information 6*c* including the division number and one or more token values, and sets a header of the divisional file (for the top page app1-1) (step S34). The sending control part 33 may acquire the value of the "DIVISION NUMBER" from the divisional configuration DB 36, and may set the value of the "DIVISION NUMBER" (called "division number") and the one or more token values corresponding to the division number to the control information 6*c*.

Each of the token values is regarded as a value indicating association between one divisional file and other divisional files. In the embodiment, by the token values, each of the divisional files for respective pages being linked from the top page app1-1 is specified.

The sending control part 33 determines whether the divisional file is being sent (step S35). There is a case in which the acquisition request has been made and a divisional transmission is being conducted for another application. When any divisional file is not being sent (NO in step S35), the sending control part 33 advances to step S37, and instructs the sending part 34 to send the divisional file (which may be the top page app1-1) to which the control information 6*c* is additionally provided (step S37). Then, the transmission control process is terminated.

When the divisional file is being sent (YES in step S35), the sending control part 33 decreases a priority of a transmission task for the divisional file currently being transmitted (step S36), and instructs the sending part 34 to send the divisional file of the top page app1-1, instead (step S37).

By conducting steps S36 and S37, the divisional file including the top page app1-1 is preferentially sent.

When the report indicates the acquisition request of the divisional files (YES in step S32), the sending control part 33 determines whether the encryption of the divisional files being requested is completed (step S38). The sending control part 33 determines by referring to the divisional configuration DB 36 and checking a value of the "ENCRYPTION COMPLETION FLAG" for the divisional files being requested. When the encryption of the divisional files has not been completed (NO in step S38), the sending control part 33 repeats step S38 at predetermined intervals.

When the encryption of the divisional files is completed (YES in step S38), the sending control part 33 determines whether a request of decreasing the priority exists (step S39). When the request of decreasing the priority exists (YES in step S39), the sending control part 33 temporarily stops sending the divisional file (step S40), goes back to step S39, and repeats the above described process.

When there is no request of decreasing the priority (NO in step S39), the sending control part 33 is sending the divisional file during a distribution time being assigned (step S41). After the distribution time, the sending control part 33 determines whether the transmission of the divisional file is completed (step S42). In a case in which a part of the divisional file has been sent, that is, in a case in which there is a not-sent portion in the divisional file, the sending control part 33 goes back to step S39, and repeats the above described process. On the other hand, in a case in which the transmission of the entire divisional file is completed, the sending control part 33 terminates the transmission control process.

The divisional files may be encrypted in a ZIP format by the divisional server 4. An encryption may be conducted in another format.

Figure 10:
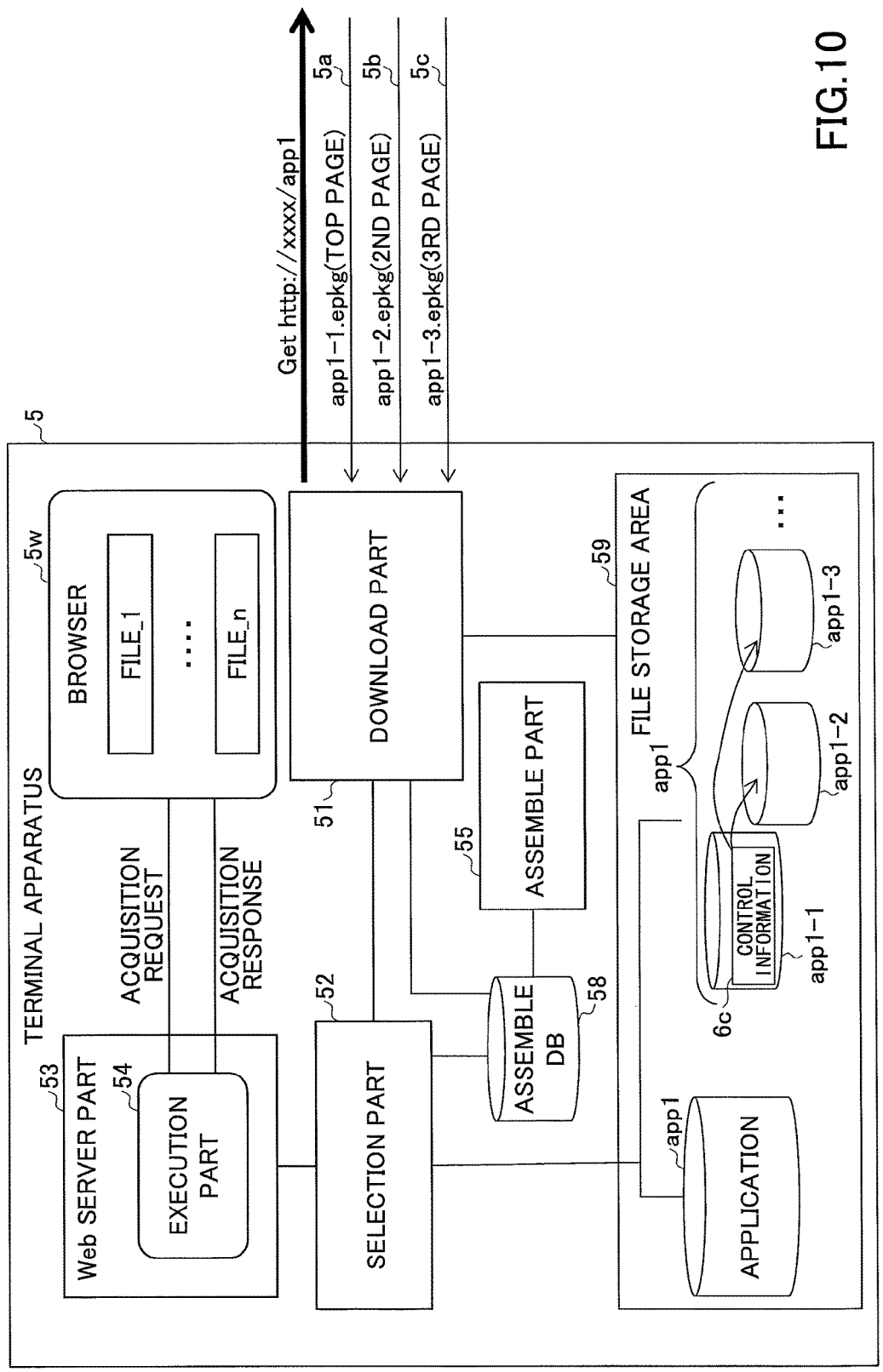
FIG. 10 is a diagram illustrating a functional configuration example of a terminal apparatus.

In the following, the terminal apparatus 5 will be described. FIG. 10 is a diagram illustrating a functional configuration example of the terminal apparatus. In FIG. 10, the terminal apparatus 5 includes a download part 51, a selection part 52, a Web server part 53 including an execution part 54, an assemble part 55, and a browser 5w. The parts 51 to 55 may be realized by the CPU 11b executing respective programs. The storage part 130b includes a file storage area 59 and also stores an assemble DB 58.

The download part 51 sends an acquisition request to the divisional server 4, in response to each of the acquisition requests of the application and a file for each page from the selection part 52, and downloads the file corresponding to the acquisition request from the divisional server 4. The downloaded divisional file is stored in the file storage area 59.

Also, the download part 51 records information acquired by downloading the application indicated by the acquisition request, to the assemble DB 58. When receiving the divisional file of the top page app1-1, the download part 51 acquires the division number from the control information 6c included in the divisional file, and records the acquired division number to the assemble DB 58.

The selection part 52 selects either one of the application app1 and the divisional files app1-1 to app1-3, which have been restored, from the file storage area 59 in response to the acquisition request of the application or the file from the Web server part 53, and sends back the file indicated by the acquisition request. The application app1 being restored may be maintained by one file. Hereinafter, the application app1 and the divisional files app1-1 to app1-3 are collectively called "files".

The Web server part 53 receives the acquisition request of the file from the browser 5w, requests the file of the selection part 52, decrypts the file provided from the selection part 52, and performs according to contents of the file. Thus, the Web server part 53 includes the execution part 54 which decrypts and executes the contents of the file. By decrypting and performing the contents of the file by the execution part 54, the application app1 or a part of the application app1 is activated on the browser 5w.

The browser 5w displays various pages provided by the application app1 in response to operations of the user. The browser 5w may support Cascading Style Sheets (CSS) as an external style sheet file, and Javascript (registered trademark) as well as the HTML5.

The assemble part 55 conducts a divisional signature check (a check by using the divisional signature of the divisional server 4 which corresponds to step S5-1 in FIG. 4) and a pre-check (which corresponds to steps S6-1 and S7-1). While confirming that each of the divisional files app1-1 to app1-3 is secured by the divisional server 4, the assemble part 55 assembles the divisional files app1-1 to app1-3.

Also, when assembling the application app1, the assemble part 55 checks the signature of the application server 3, and confirms assurance for the entire application app1. The application app1, which has been completely restored, is retained in the file storage area 59.

FIG. 11 is a diagram illustrating a data configuration example of the assemble DB 58. In FIG. 11, the assemble DB 58 is a database for maintaining a state of each of downloaded files, and includes items "URL", "FILE NAME", "DIVISION NUMBER", "EXECUTABLE STATE", "DL COMPLETION FLAG", and the like.

The "URL" indicates location information of the application indicated by the user of the terminal apparatus 5. The "FILE NAME" indicates a name of the file when the file is downloaded. The "DIVISION NUMBER" indicates a number of divisions when the application is divided into multiple files, and is set with respect to the file including the top page 5a.

The "EXECUTABLE STATE" indicates an executable state or a non-executable state by the execution part 54. When the "EXECUTABLE STATE" indicates "EXECUTABLE", the state is executable by the execution part 54. When the "EXECUTABLE STATE" indicates the "NON-EXECUTABLE", the state is not executable by the execution part 54.

The "DL COMPLETION FLAG" indicates whether or not the download is completed. When the "DL COMPLETION FLAG" indicates "COMPLETED", the downloading of the file is completed. When the "DL COMPLETION FLAG" indicates "NOT COMPLETED", the downloading of the file is being downloaded.

FIG. 11 illustrates that the application indicated by "http://xxx/app1" in the "URL" is divided into three and is downloaded. It is possible to comprehend an assembling state by a combination of the "EXECUTABLE STATE" and the "DL COMPLETION FLAG".

Since the "DL COMPLETION FLAG" indicates "COMPLETED", it is comprehended that the app1-1.zip has been downloaded. In addition, since the "EXECUTABLE STATE" indicates "EXECUTABLE", it is comprehended that the app1-1.zip has been confirmed by the divisional signature.

Since the "DL COMPLETION FLAG" indicates "COMPLETED", it is comprehended that the app1-2.zip has been downloaded. However, since the "EXECUTABLE STATE" indicates "NON-EXECUTABLE", it is comprehended that the app1-2.zip has not been executable. Accordingly, the downloading of the app1-2.zip has been completed, but the pre-check has not been confirmed for the app1-2.zip.

Since the "DL COMPLETION FLAG" indicates "NOT COMPLETED", it is comprehended that the downloading of the app1-3.zip is not completed. Also, since the "EXECUTABLE STATE" indicates "NON-EXECUTABLE", it is comprehended that the app1-3.zip has not been executable. Accordingly, the app1-3.zip is in a state of waiting for the completion of the downloading.

In another example, since the "DIVISION NUMBER" of "http://xxx/app2" indicates "1", the entire application of "http://xxx/app2" is downloaded instead of dividing into two or more. However, the downloading of the application "http://xxx/app2" has not been completed.

In any of the above described file states, the application is executable in an on-line state.

A download process performed by the download part 51 will be described. The download process mainly includes a download (DL) pre-process, and a download (DL) task process. The DL pre-process will be described with reference to FIG. 12, and the DL task process will be described with reference to FIG. 13.

Figure 12:
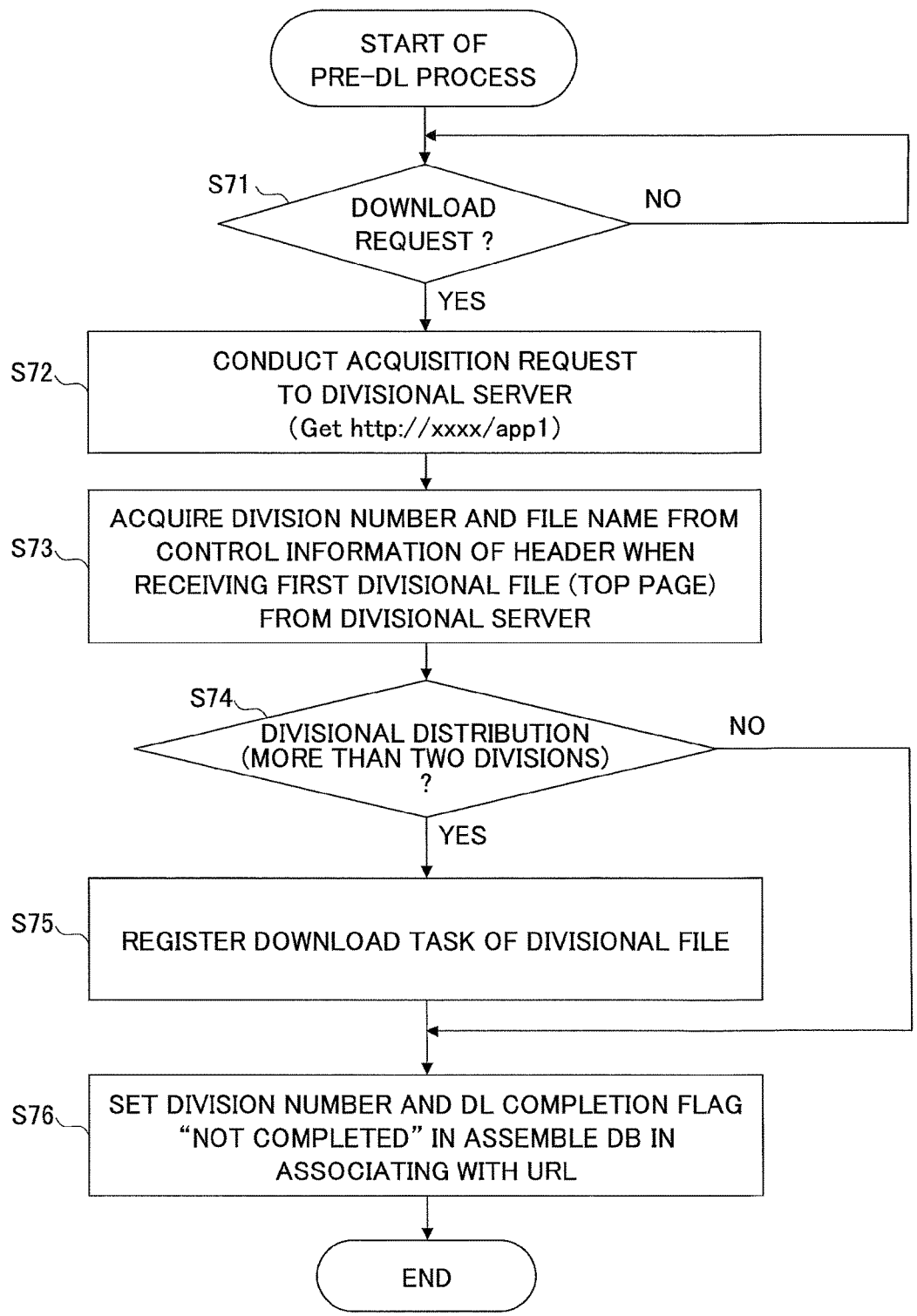
FIG. 12 is a flowchart for explaining a DL pre-process.

FIG. 12 is a flowchart for explaining the DL pre-process. In the terminal apparatus 5, the DL pre-process of the download part 51 may be realized by the CPU 11b executing a corresponding program.

In FIG. 12, the download part 51 determines whether a request received from the selection part 52 indicates a download request (step S71). The acquisition request of the application may correspond to the download request. When the request from the selection part 52 does not indicate the download request (NO in step S71), the download part 51 repeats step S71 every time the request is received from the selection part 52.

When the request from the selection part 52 indicates the download request (YES in step S71), the download part 51 sends the acquisition request of the file (the application or the divisional file) to the divisional server 4 (step S72). As the acquisition request, "Get http://xxxx/app1" is sent to the divisional server 4. When receiving a first divisional file (which may be the top page 5*a*) from the divisional server 4, the download part 51 acquires the division number and the file name from the control information 6*c* in the header of the first divisional file (step S73).

The download part 51 determines whether this download is a divisional distribution performed by dividing the application app1 (step S74). If the division number acquired from the control information 6*c* indicates more than one, the download part 51 determines that this download is the divisional distribution. When the division number indicates one, it is determined that the entire application app1 is distributed.

When it is determined that this download is the divisional distribution (YES in step S74), the download part 51 registers a download task for each of the divisional files (step S75), and sets the "DIVISION NUMBER" and the "DL COMPLETION FLAG" in associating with the "URL" indicated by the acquisition request (step S76). After that, the download part 51 terminates the DL pre-process.

When it is determined that this download is not the divisional distribution (NO in step S74), the download part 51 sets the "DIVISION NUMBER" and the "DL COMPLETION FLAG" in associating with the "URL" indicated by the acquisition request (step S76). After that, the download part 51 terminates the DL pre-process.

Figure 13:
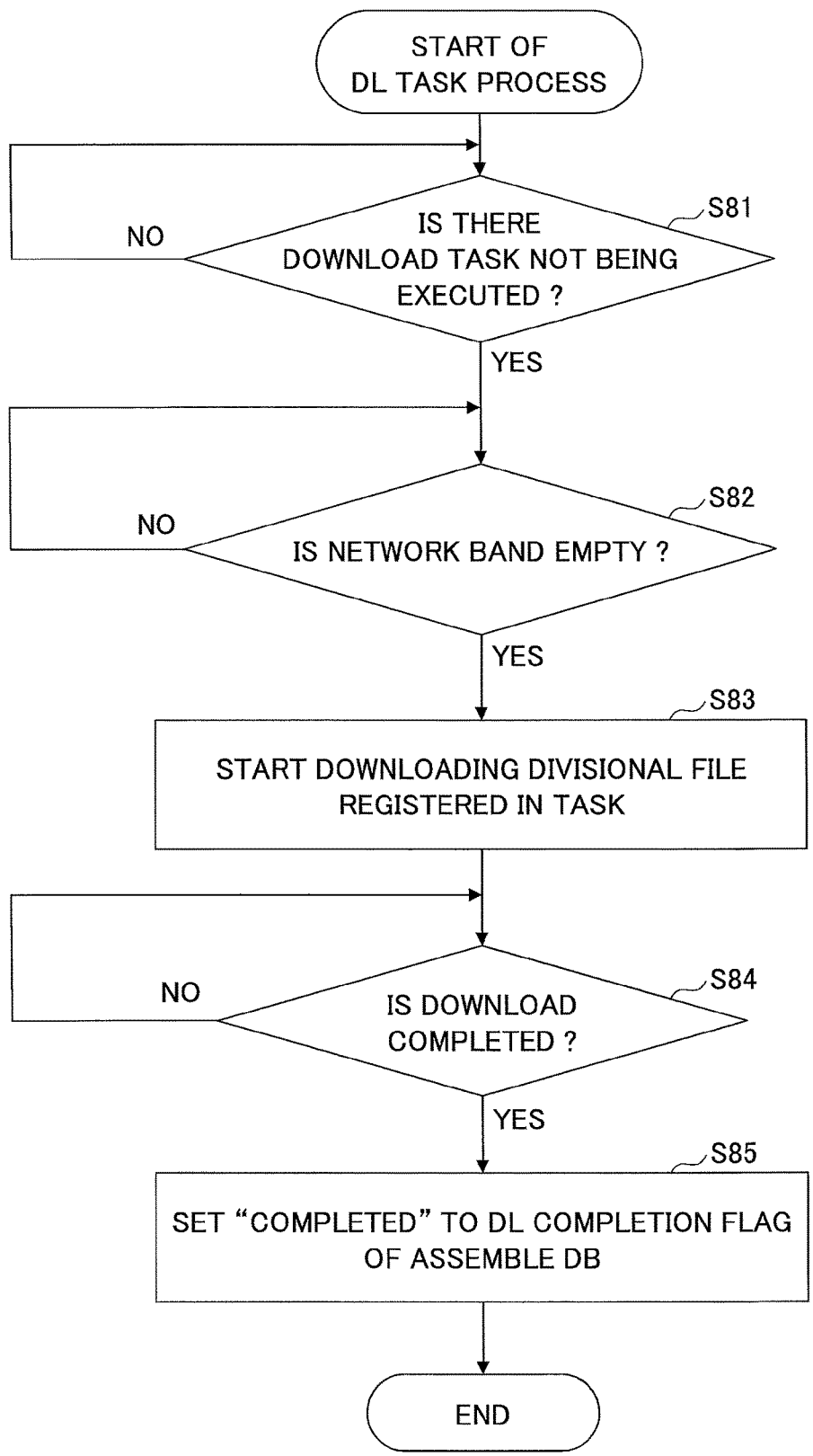
FIG. 13 is a diagram for explaining the DL task process.

FIG. 13 is a diagram for explaining the DL task process. The DL task process performed of the download part 51 may be realized by the CPU 11*b* executing a corresponding program.

In FIG. 13, the download part 51 determines whether there is a download task not being executed (step S81). When there is no the download task not being executed (NO in step S81), the download part 51 repeats step S81 at predetermined intervals.

When there is the download task not being executed (YES in step S81), the download part 51 determines whether a network band is empty for the download (step S82). When the network band is not empty (NO in step S82), the download part 51 repeats step S82 at predetermined intervals. When the network band is empty (YES in step S82), the download part 51 starts downloading the divisional file being registered as the task (step S83).

The download part 51 determines whether the download is completed (step S84). When the download has not been downloaded (NO in step S84), the download part 51 repeats step S84 at predetermined intervals. When the download is completed (YES in step S84), the download part 51 sets "COMPLETED" to the "DL COMPLETION FLAG" in the assemble DB 58 (step S85). The DL task process is then terminated.

Figure 14:
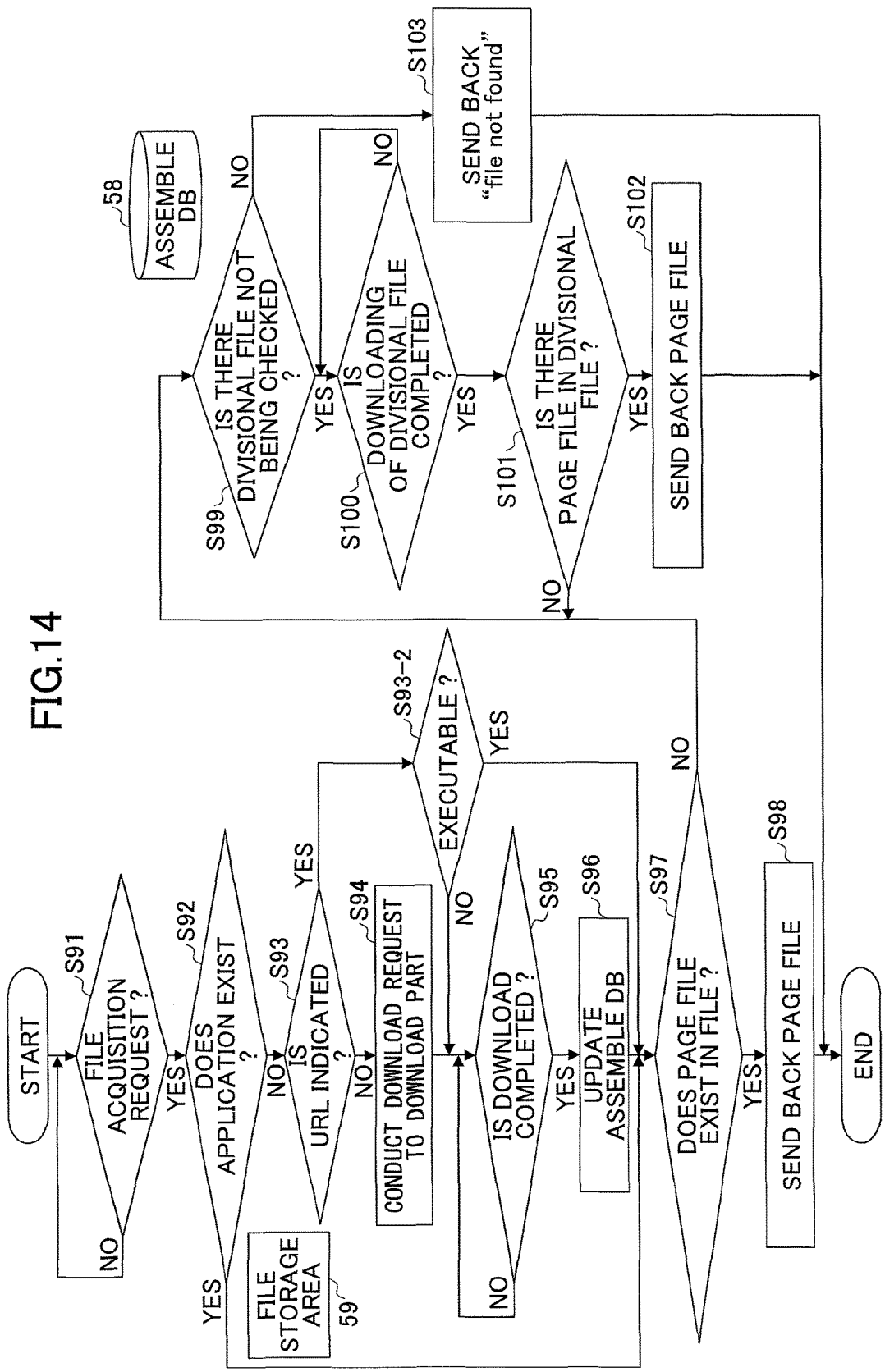
FIG. 14 is a flowchart for explaining a selection process.

Next, a selection process performed by the selection part 52 will be described. FIG. 14 is a flowchart for explaining the selection process. In the terminal apparatus 5, the selection process of the selection part 52 may be realized by the CPU 11*b* executing a corresponding program.

In FIG. 14, the selection part 52 determines whether the request from the Web server part 53 is the file acquisition request (step S91). When the request is not the file acquisition request (NO in step S91), the selection part 52 repeats step S91 at predetermined intervals.

When the request is the file acquisition request (YES in step S91), the selection part 52 refers to the file storage area 59, and determines whether the application of the URL indicated by the file acquisition request exists (step S92). When the file has been downloaded, that is, the application retains an original state (or a restored state), the selection part 52 advances to step S97.

When the application does not exist in the file storage area 59 (NO in step S92), the selection part 52 determines whether the URL indicated by the file acquisition request exists in the assemble DB 58 (step S93). When the URL exists in the assemble DB (YES in step S93), the selection part 52 further determines whether the "EXECUTABLE STATE" indicates "EXECUTABLE" (step S93-2).

When the application exists in the file storage area 59 (YES in step S93-2), the selection part 52 acquires the file name from the assemble DB 58, acquires the divisional file having a same file name from the file storage area 59, and advances to step S97. When the "EXECUTABLE STATE" indicates "NON-EXECUTABLE", the selection part 52 advances to step S95, and waits for the completion of the download.

When the URL does not exist either in the assemble DB 58 (NO in step S92), the selection part 52 advances to step S94, and sends the download request to the download part 51.

When the URL indicated by the file acquisition request does not exist (NO in step S93), that is when the application does not exist, the selection part 52 sends the download request to the download part 51 (step S94). After that, the selection part 52 determines by referring to the assemble DB 58 whether the download is completed (step S95). When the download is not completed, the selection part 52 repeats step S95 at predetermined intervals. When the download is completed, the selection part 52 updates the assemble DB 58 (step S96).

The selection part 52 determines whether the page file exists in the file (step S97). The file may correspond to a file of the application or the divisional file. When the page file exists, the selection part 52 sends back the page file to the Web server part 53 (step S98). After that, the selection part 52 terminates the selection process.

On the other hand, when it is determined in step S97 that the page file does not exist in the file, the selection part 52 refers to the assemble DB 58, and determines whether there is the divisional file not being checked in one or more divisional files for which the "EXECUTABLE STATE" indicates "EXECUTABLE" (step S99).

The selection part 52 refers to the "DL COMPLETION FLAG" of the assemble DB 58, and determines whether the download of the divisional file is completed (step S100). When the download of the divisional file is not completed, the selection part 52 repeats step S100 at predetermined intervals.

When the download of the divisional file is completed, the selection part 52 determines whether the page file exists in the divisional file (step S101). When the page file does not exist in the divisional file, the selection part 52 goes back to step S99 and repeats the above same process. When the page file exists in the divisional file, the selection part 52 sends back the page file to the Web server part 53 (step S102). After that, the selection part is terminated.

In step S99, when there is no divisional file not being checked, the selection part 52 sends back a "file not found" error to the Web server part (step S103). After that, the selection process is terminated.

Figure 15:
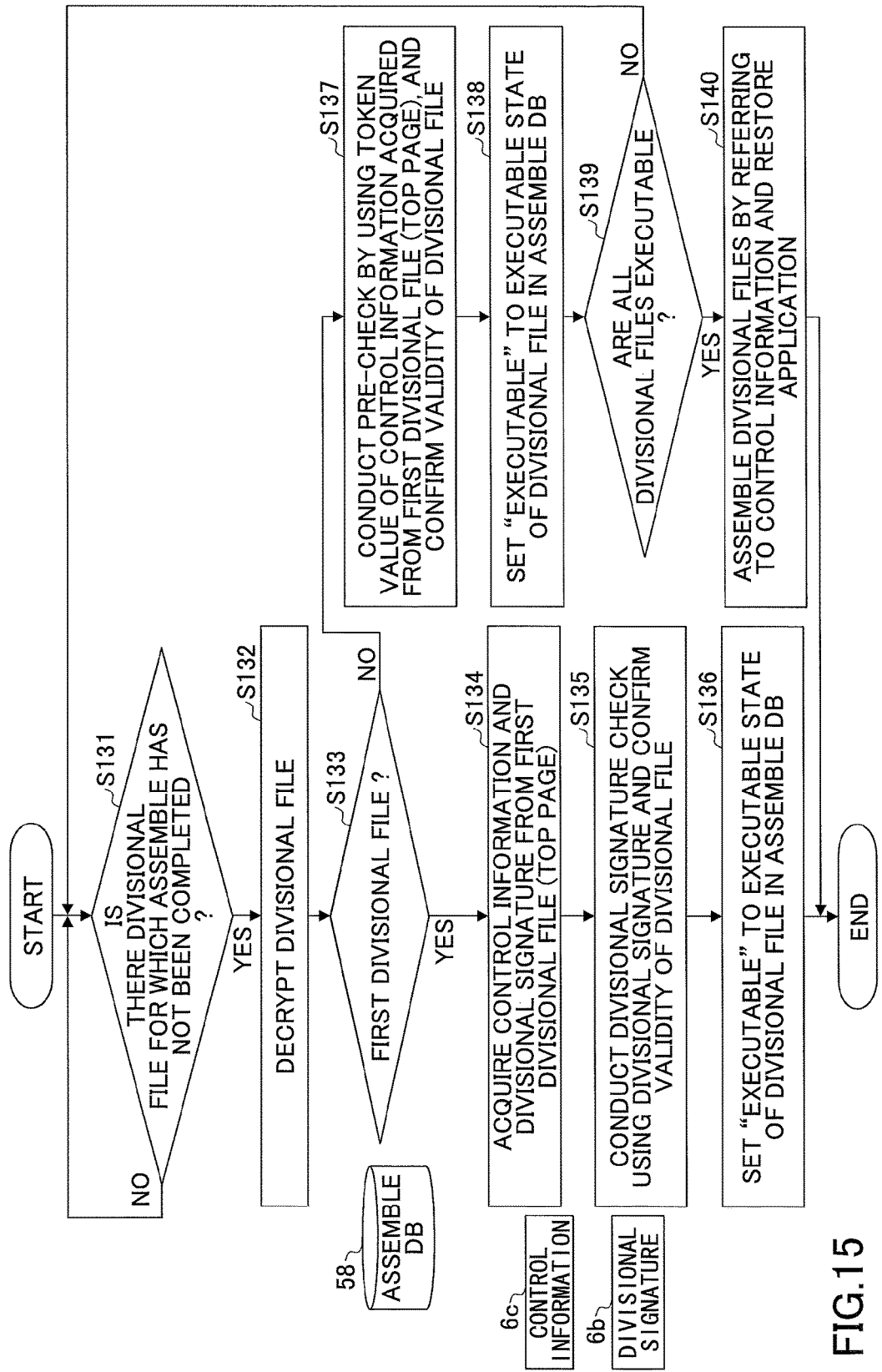
FIG. 15 is a flowchart for explaining an assemble process conducted by an assemble part.

FIG. 15 is a flowchart for explaining an assemble process conducted by the assemble part 55. After the download part 51 sends the acquisition request of the application to the divisional server 4 and starts the download, the assemble part 55 starts the assemble process when the first divisional file (the top page) is stored in the file storage area 59.

In FIG. 15, the assemble part 55 refers to the assemble DB 58, and determines whether the divisional file not being assembled exists (step S131). When the divisional file not being assembled does not exist, the step S131 is repeated at predetermined intervals.

When the divisional file not being assembled exists, the assemble part 55 decrypts the divisional file (step S132). When the divisional file is the first divisional file, the assemble part 55 acquires the control information 6c and the divisional signature 6b from the first divisional file (the top page 5a) (step S134), conducts the divisional signature check using the acquired divisional signature 6b, and confirms validity of the first divisional file (step S135).

When confirming the validity of the first divisional file, the assemble part 55 sets the "EXECUTABLE" to the "EXECUTABLE STATE" (step S136). After that, the assemble process is terminated.

On the other hand, when the divisional file is not the first divisional file (NO in step S133), the assemble part 55 conducts the pre-check by using the token value of the control information 6b acquired from the first divisional file, and confirms the validity of the first divisional file (step S137). After the pre-check, the assemble part 55 sets the "EXECUTABLE" to the "EXECUTABLE STATE" for the first divisional file in the assemble DB 58 (step S138).

The assemble part 55 determines whether all divisional files become executable, concerning the same URL in the assemble DB 58 (step S139). When not all divisional files are executable (NO in step S139), the assemble part 55 goes back to step S131, and repeats the above described same process. When all divisional files are executable (YES in step S139), the assemble part 55 refers to the control information 6c, assembles the divisional files, and restores the application (step S140). After that, the assemble process is terminated. The restored application is retained in the file storage area 59.

The selection part 52 selects and provides the restored application or the divisional application from the file storage area 59 to the execution part 54 of the Web server part 53.

Figure 16:
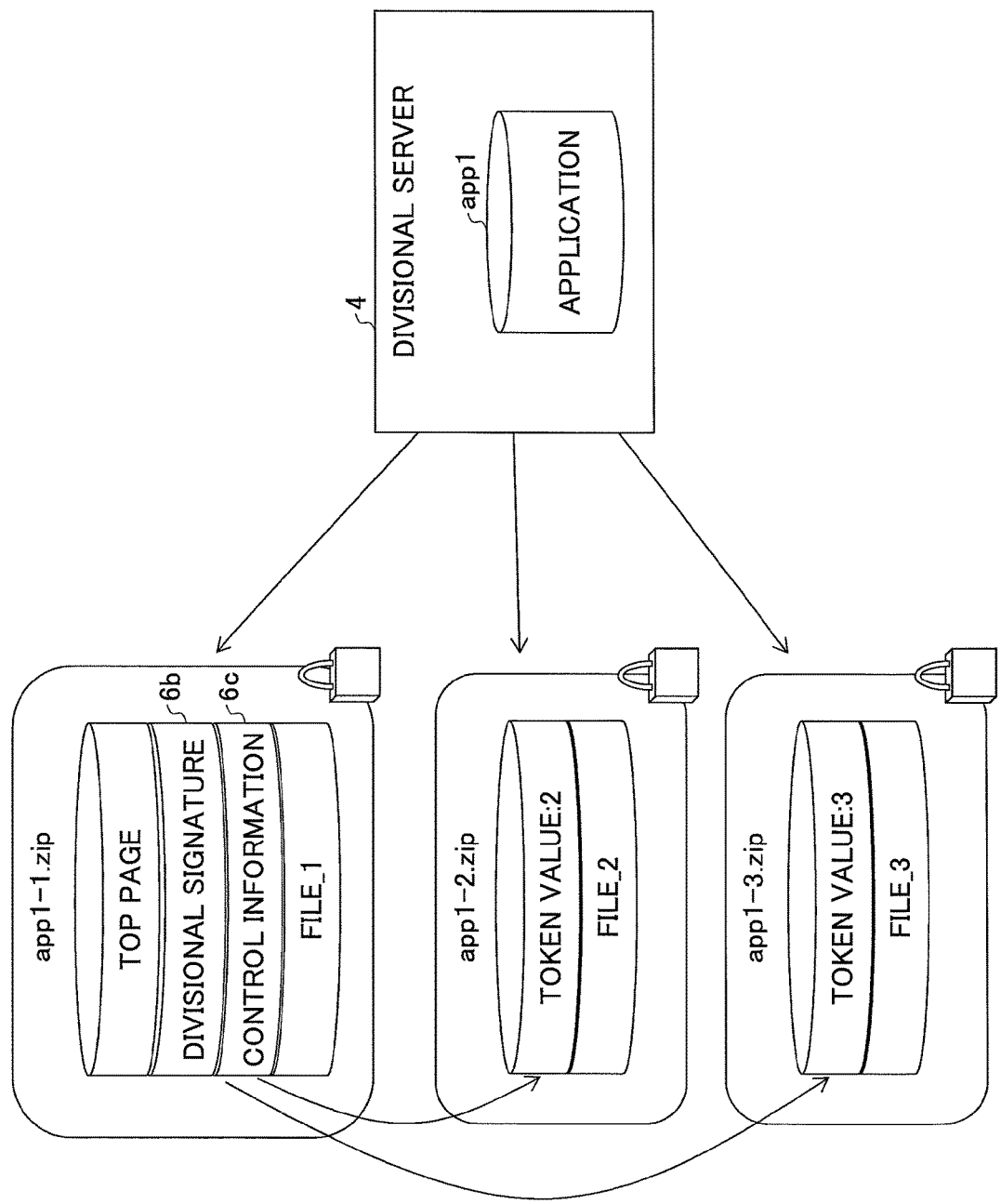
FIG. 16 is a diagram illustrating a division example of an application.

FIG. 16 is a diagram illustrating a division example of the application. FIG. 16 illustrates that the divisional server 4 divides the application app1 including a file_1, a file_2, and a file_3 into each of file_1, a file_2, and a file_3.

The file "app1-1.zip" includes the file_1 of the top page 5a, includes the divisional signature 6b, and the control information 6c, and is encrypted. The file "app1-2.zip" includes the file_2, and is encrypted. The file "app1-3.zip" includes the file_3, and is encrypted.

By the token value set in the control information 6c, the file "app1-1.zip" is associated with other files "app1-2.zip" and "app1-3.zip".

One divisional file may correspond to a file for at least one page. Alternatively, one divisional file may include files for two pages.

Figure 17:
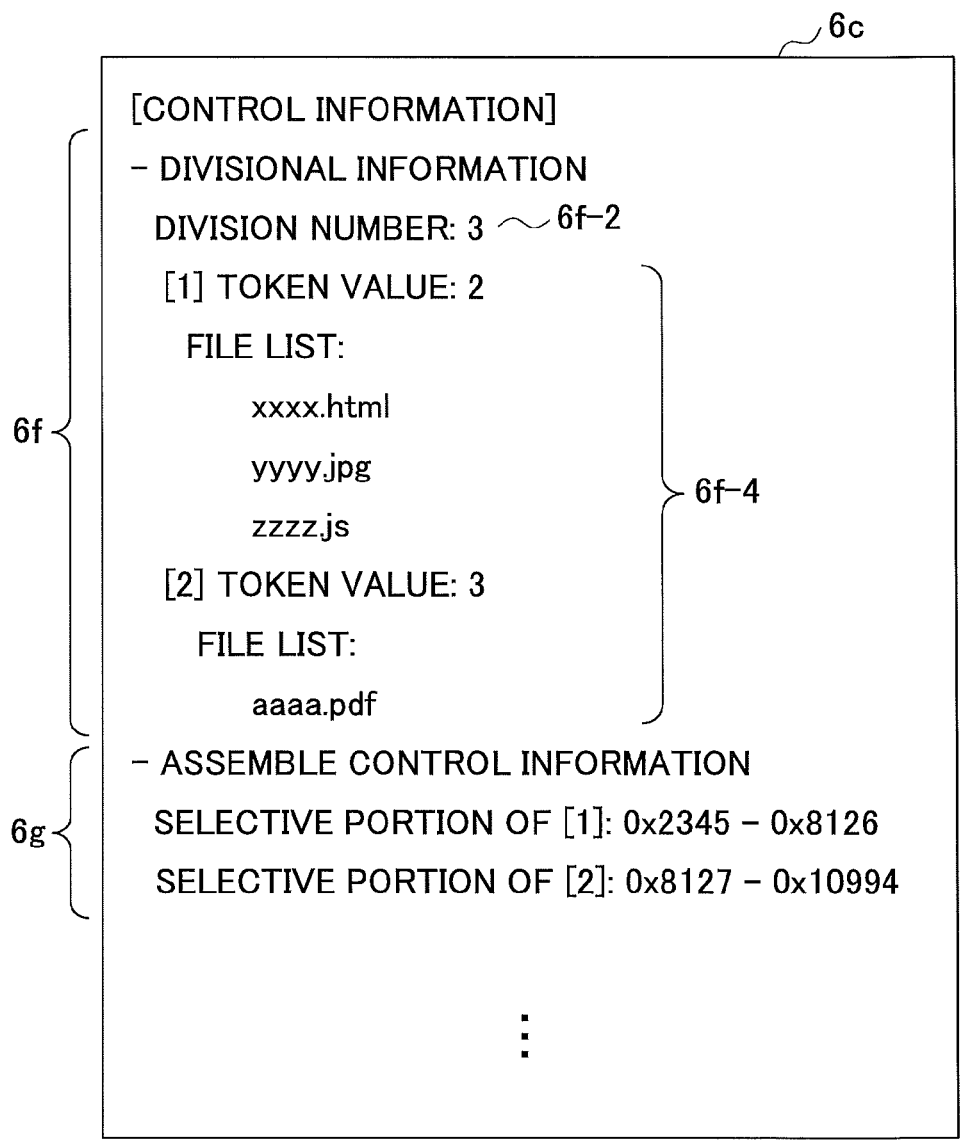
FIG. 17 is a diagram illustrating a data example of control information in a case of the division example depicted in FIG. 16.

FIG. 17 is a diagram illustrating a data example of the control information in a case of the division example depicted in FIG. 16. The control information 6c includes divisional information 6f, assemble control information 6g, and the like.

The divisional information 6f includes at least a divisional number 6f-2, token information 6f-4, and the like. The division number 6f-2 indicates the division number of the application app1. The divisional number "3" indicates that the application app1 is divided into three. The token information 6f-4 indicates information of other two divisional files being associated with, the token values, and a file list, and the like. In this example, the divisional file having the token value "2" includes "xxxx.html", "yyyy.jpg", and "zzzz.js". The divisional file having the token value "3" includes "aaaa.pdf".

The assemble control information 6g indicates extraction portions for each token value by a list. Each of the extraction portions is indicated by a relative address from a beginning in a file of the entire application. In this example, a portion extracted for the file included in the divisional file of the token value "2" corresponds to "0x2345-0x8126". Also, a portion, in which the file included in the divisional file of the token value "3" is extracted, corresponds to "0x8127-0x10994".

It is possible for the assemble part 55 to refer to the assemble control information 6g of the control information 6c when the divisional files are assembled in step S14 in FIG. 15, and to sequentially assemble the file_1, the file_2, and the file_3. The divisional information 6f and the assemble control information 6g in the control information 6c correspond to restore information.

The assemble part 55 may conduct the signature check for confirming the validity of the entire application app1 by using the signature of the application server 3 with respect to the assembled application app1. Alternatively, the execution part 54 may conduct the signature check when the application app1 is executed.

Figure 18A:
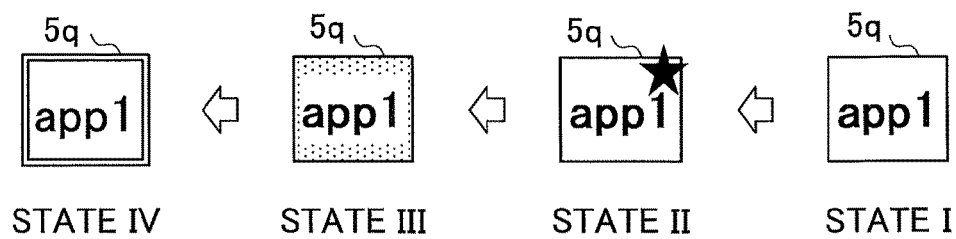
FIG. 18A and FIG. 18B are diagrams illustrating state display examples of the application.
Figure 18B:
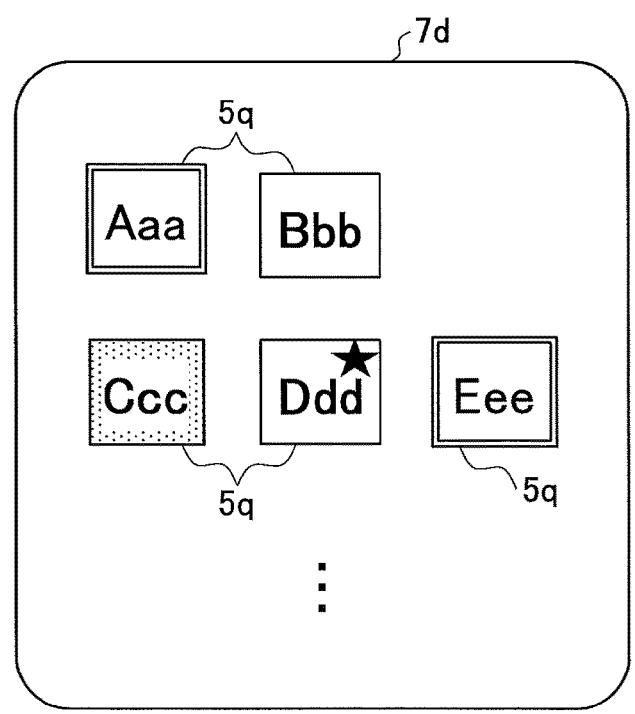

A display example of displaying the executable state of the application app1 at the terminal apparatus 5 will be described. FIG. 18A and FIG. 18B are diagrams illustrating state display examples of the application. FIG. 18A illustrates an icon in each state transition of the application app1. In FIG. 18A, an icon 5q indicating the application app1 is displayed as follows:

State I: executable in the on-line state
State II: executable in the on-line state and being downloaded
State III: executable
State IV: executable in the off-line state Accordingly, a current state of the application app1 is easily comprehended.

In FIG. 18B, a display example of the terminal apparatus 8 is depicted. In FIG. 18B, multiple applications "Aaa", "Bbb", "Ccc", "Ddd", "Eee", and the like are displayed.

It is understood that the applications "Aaa" and "Eee" are executable in the off-line state (the state IV). It is understood that the application "Ccc" is executable (the state III). The application "Ddd" is executable in the off-line state and is being downloaded (the state II). Moreover, it is understood that the application "Bbb" is executable in the on-line state (state III).

By displaying the states of the icons 5q as described above, it is possible for the user using the terminal apparatus 5 to easily comprehend whether the application is executable only in the off-line state or is also executable in the off-line state.

As described above, in the embodiment, the terminal apparatus 5 exchanges keys with the divisional server 4 beforehand, and performs a simple check by using the divisional signature 6b in the divisional file of the top page 5a, so as to immediately make the top page 5a executable.

Also, by performing the pre-check for each of the divisional files, which are sequentially transmitted, by using the control information 6c included in the divisional file of the top page, it is possible to execute each of the divisional files any time.

Accordingly, compared with the related art in which the application assembled by the divisional files becomes executable after being secured by the application server 3, in the embodiment, it is possible for the user to execute the application at an earlier stage.

Moreover, even if the application is divided and distributed, it is possible to promptly activate the application.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distribution method performed by a first processor and a second processor, the distribution method comprising:
   a first process performed by the first processor including
      dividing a program to which a first signature is applied;
      attaching control information including restore information pertinent to restoring the program and a second signature to secure divisional files of the program, to at least one of the divisional files; and
      sending each of the divisional files via an Internet, and
   a second process performed by the second processor including
      receiving a first divisional file and a second divisional file, which divide the program, through the Internet;
      checking that the first divisional file is secured by using the second signature being attached to the first divisional file; and
      making the secured first divisional file executable.

2. The distribution method as claimed in claim 1, wherein the first process further includes:
   confirming security of the program by using the first signature; and
   dividing the program based on a file configuration of the program.

3. The distribution method as claimed in claim 1, wherein the second process further includes:
   confirming validity of the second divisional file by using the restore information included in the control information of the first divisional file; and
   making the confirmed second divisional file executable.

4. The distribution method as claimed in claim 3, wherein the second process further includes:
   restoring the program by assembling the first divisional file and the second divisional file; and
   confirming, by the first signature, the validity of the program being restored.

5. The distribution method as claimed in claim 4, wherein the restore information indicates associations among the divisional files.

6. A distribution system, comprising:
   a first memory,
   a first processor coupled to the first memory and the first processor configured to
      divide a program to which a first signature is applied;
      attach control information including restore information pertinent to restoring the program and a second signature to secure divisional files of the program, to at least one of the divisional files; and
      send each of the divisional files via an Internet,
   a second memory, and
   a second processor coupled to the second memory and the second processor configured to
      receive a first divisional file and a second divisional file, which divide the program, through the Internet;
      check that the first divisional file is secured by using the second signature being attached to the first divisional file; and
      make the secured first divisional file executable.

7. A terminal apparatus, comprising:
   a memory, and
   a processor coupled to the memory and the processor configured to
      download a first divisional file and a second divisional file acquired by dividing a program to which a first signature is attached, through an Internet;
      confirm security of the program by using the first signature; and
      make the first divisional file executable,
   wherein control information including restore information pertinent to restoring the program and a second signature are attached to secure divisional files of the program to one or more the first divisional file and the second divisional file.

8. The terminal apparatus as claimed in claim 7, wherein validity of the second divisional file is confirmed by using restored information included in the first divisional file, and
   the second divisional file is made to be executable.

9. The terminal apparatus as claimed in claim 7, wherein the processor is further configured to:
   confirm validity of the second divisional file by using the restore information included in the control information of the first divisional file; and
   make the confirmed second divisional file executable.

10. The terminal apparatus as claimed in claim 9, wherein the processor is further configured to:
   restore the program by assembling the first divisional file and the second divisional file; and
   confirm, by the first signature, the validity of the program being restored.

11. The terminal apparatus as claimed in claim 10, wherein the restore information indicates associations among the divisional files.

* * * * *